(12) United States Patent
Leaders et al.

(10) Patent No.: US 10,378,940 B2
(45) Date of Patent: Aug. 13, 2019

(54) DEVICES AND SYSTEM FOR CHANNELING AND AUTOMATIC MONITORING OF FLUID FLOW IN FLUID DISTRIBUTION SYSTEMS

(71) Applicants: Soneter, Inc., Atlanta, GA (US); Aimee Smith, Wooster, OH (US)

(72) Inventors: Jeffrey L. Leaders, Mableton, GA (US); Matthew Shane Smith, Wooster, OH (US); Francis M. Mess, Smyrna, GA (US); Samuel Elia, Atlanta, GA (US); Jorge C. Almirall, Acworth, GA (US); Brian Gestner, Atlanta, GA (US)

(*) Notice: Subject to any disclaimer, the term of this patent is extended or adjusted under 35 U.S.C. 154(b) by 0 days.

(21) Appl. No.: 14/996,003

(22) Filed: Jan. 14, 2016

(65) Prior Publication Data

US 2016/0161310 A1 Jun. 9, 2016

Related U.S. Application Data

(63) Continuation of application No. PCT/US2015/045320, filed on Aug. 14, 2015.

(60) Provisional application No. 62/037,511, filed on Aug. 14, 2014.

(51) Int. Cl.
*G01F 1/66* (2006.01)
*G01F 15/00* (2006.01)

(52) U.S. Cl.
CPC .............. *G01F 1/663* (2013.01); *G01F 1/662* (2013.01); *G01F 1/66* (2013.01); *G01F 15/005* (2013.01)

(58) Field of Classification Search
CPC . G01F 1/663; G01F 1/662; G01F 1/66; G01F 15/005; G06Q 50/06
See application file for complete search history.

(56) References Cited

U.S. PATENT DOCUMENTS

| 3,916,990 A | 11/1975 | Ruhe et al. |
| 4,112,494 A | 9/1978 | Elliott et al. |
| 5,343,737 A | 9/1994 | Baumoel |
| 6,725,878 B1 | 4/2004 | Nawa et al. |

(Continued)

FOREIGN PATENT DOCUMENTS

| EP | 0 932 029 A2 | 7/1999 |
| EP | 1 803 998 A1 | 7/2007 |

(Continued)

OTHER PUBLICATIONS

Cai et al., "Pattern recognition using Markov random field models", 2002, Pattern Recognition 35 (2002) 725-733.*

(Continued)

*Primary Examiner* — Regis J Betsch
(74) *Attorney, Agent, or Firm* — Foley & Lardner LLP

(57) ABSTRACT

A fluid manifold is capable of channeling and monitoring fluid flow within a fluid distribution system. The manifold includes one or more input lumens. Each input lumen associated with a respective inlet port. The manifold also includes a plurality of output lumens such that each output lumen is associated with a respective outlet port and at least one input lumen is coupled to two or more output lumens. The manifold also includes one or more flow sensors capable of measuring fluid flow parameters of fluid flowing through at least one of the one or more input lumens and the plurality of output lumens. In some implementations, a flow sensor can be mounted to each output lumen of the manifold.

16 Claims, 23 Drawing Sheets

(56) References Cited

U.S. PATENT DOCUMENTS

| | | | |
|---|---|---|---|
| 7,093,502 | B2 | 8/2006 | Kupnik et al. |
| 8,618,941 | B2* | 12/2013 | Javey .................. H04Q 9/00 340/605 |
| 8,973,424 | B2 | 3/2015 | Wiktor |
| 2004/0050790 | A1 | 3/2004 | Baarman et al. |
| 2004/0238011 | A1 | 12/2004 | Weber |
| 2007/0079792 | A1 | 4/2007 | Dingler et al. |
| 2009/0124988 | A1 | 5/2009 | Coulthard |
| 2009/0303057 | A1 | 12/2009 | Brown |
| 2011/0022012 | A1 | 1/2011 | Kerr et al. |
| 2011/0142700 | A1 | 6/2011 | Gura et al. |
| 2011/0173249 | A1 | 7/2011 | Lee et al. |
| 2013/0080081 | A1* | 3/2013 | Dugger .................. G01F 1/667 702/48 |
| 2013/0282355 | A1 | 10/2013 | Hosking et al. |
| 2014/0069207 | A1 | 3/2014 | Leaders et al. |

FOREIGN PATENT DOCUMENTS

| | | |
|---|---|---|
| WO | WO-01/04596 A2 | 1/2001 |
| WO | WO-2014/020252 A1 | 2/2014 |

OTHER PUBLICATIONS

DeOreo et al., "Flow Trace Analysis to assess water use", 1966 Journal American Water Works Association, 80-90.*

Mounce et al., "Pattern matching and associative artificial neural networks for water distribution system time series data analysis", 2014, Journal of Hydroinformatics May 2014, 16 (3) 617-632.*

Srinivasan et al., "WaterSense: Water Flow Disaggregation Using Motion Sensors", 2011, BuildSys'11, Nov. 1, 2011.*

Dong et al., "Deep Sparse Coding Based Recursive Disaggregation Model for Water Conservation", 2013, IJCAI '13 Proceedings of the Twenty-Third international joint conference on Artificial Intelligence pp. 2804-2810.*

Vanek et al., "Estimation of Single-Gaussian and Gaussian Mixture Models for Pattern Recognition", 2013, Progress in Pattern Recognition, Image Analysis, Computer Vision, and Applications vol. 8258 of the series Lecture Notes in Computer Science pp. 49-56.*

Hyung Sul Kim, Unsupervised Disaggregation of Low Frequency Power Measurements, 2012, Thesis University of Illinois.*

Bill Gauley, "ULF Toilet Performance Monitoring Program" 2001 Veritec Consulting; http://www.map-testing.com/assets/files/Veritee%20(2001)%2OULF%20Toilet%20Performance%20Monitoring%20Program.pdf.*

Nguyen et al., "An intellegent expert system for residential water end-use classification", Feburary 2014 IEE Expert Systems with Applications 41 pp. 342-356.*

Jeff Bilmes, "A Gentle Tutorial of the EM Algorithm and its Application to Parameter Estimation for Gaussian Mixture and Hidden Markov Models", 1998 International Computer Science Institute Berkeley CA.*

Dong et al., "Deep Sparse Coding Based Recursive Disaggregation Model for Water Conservation", 2013, IJCAI '13 Proceedings of the Twenty-Third international joint conference on Artificial Intelligence, pp. 2804-2810 AAAI Press © 2013.*

Giurco et al., "Residential End-Use Measurement Guidebook a Guide to Study Design, Sampling and Technology", CSIRO 2008.*

International Search Report & Written Opinion on PCT/US2015/045418 dated Nov. 23, 2015.

International Search Report & Written Opinion on PCT/US2015/045414 dated Nov. 24, 2015.

International Search Report & Written Opinion on PCT/US2015/045320 dated Jul. 1, 2016.

International Preliminary Report on Patentability on PCT/US2015/045320 dated Feb. 23, 2017.

International Preliminary Report on Patentability on PCT/US2015/045414 dated Feb. 23, 2017.

International Preliminary Report on Patentability on PCT/US2015/045418 dated Feb. 23, 2017.

Fontdecaba Sara et al: "An Approach to Disaggregating Total Household Water Consumption into Major End-Uses", Water Resources Management, Springer Netherlands, Dordrecht, vol. 27, No. 7, Jan. 27, 2013 (Jan. 27, 2013), pp. 2155-2177, XP035375027, ISSN: 0920-4741, DOI: 10.1007/S11269-013-0281-8.

Nguyen Khoi Anh et al: "An autonomous and intelligent expert system for residential water end-use classification", Expert Systems With Applications, vol. 41, No. 2, Feb. 1, 2014 (Feb. 1, 2014), pp. 342-356, XP028733598.

Supplementary European Search Report for EP 15832312.1 dated Mar. 13, 2018 from the European Patent Office.

Supplementary European Search Report for EP 15832336.0 dated Apr. 10, 2018.

Extended Search Report for EP Application No. 15832312.1 dated Mar. 13, 2018.

Non-Final Office Action on U.S. Appl. No. 15/432,678 dated Nov. 16, 2018.

Final Office Action on U.S. Appl. No. 15/432678 dated May 31, 2019.

Office Action for EP Application No. 15832312.1 dated Mar. 22, 2019.

Office Action for CA Application No. 3,007,529 dated Apr. 10, 2019.

* cited by examiner

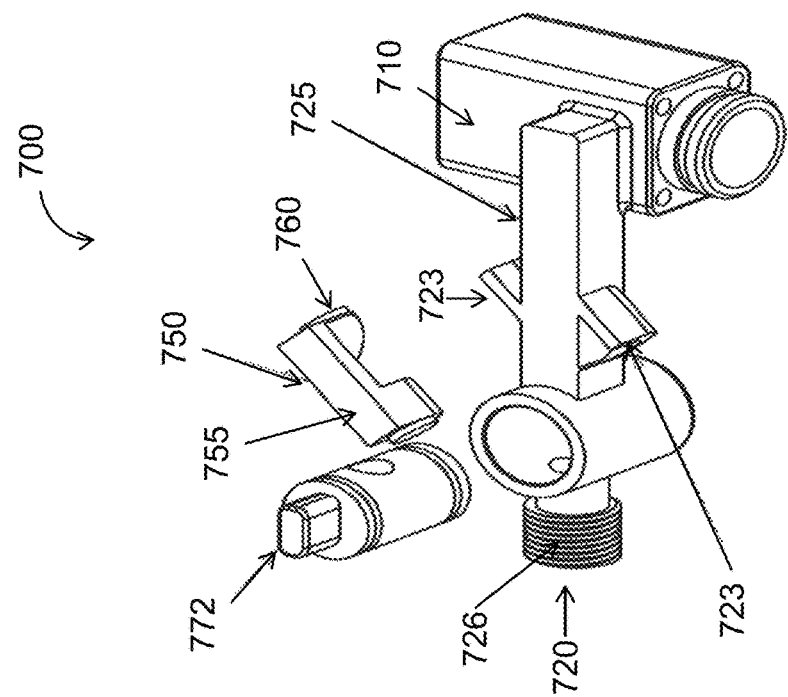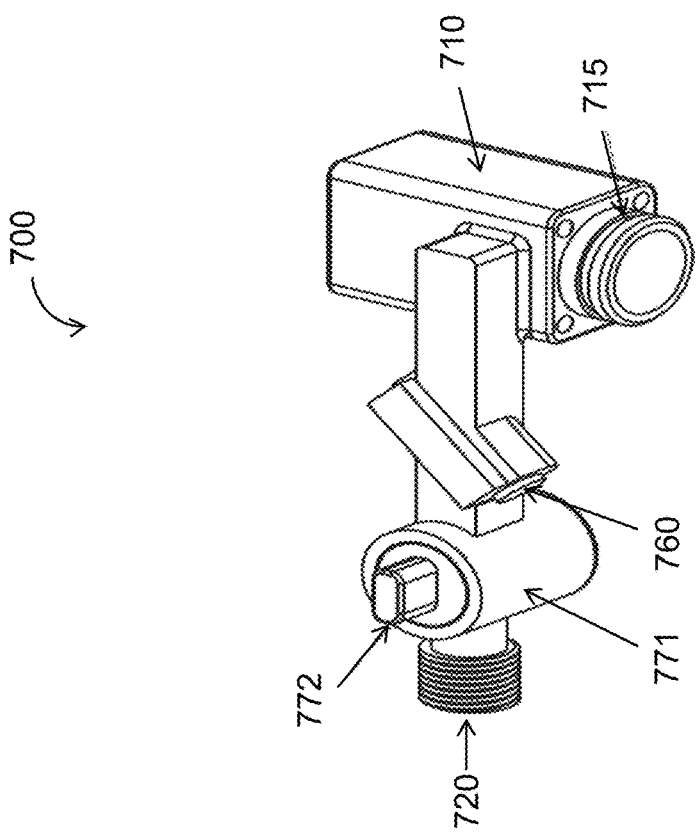
FIG. 7B
FIG. 7A

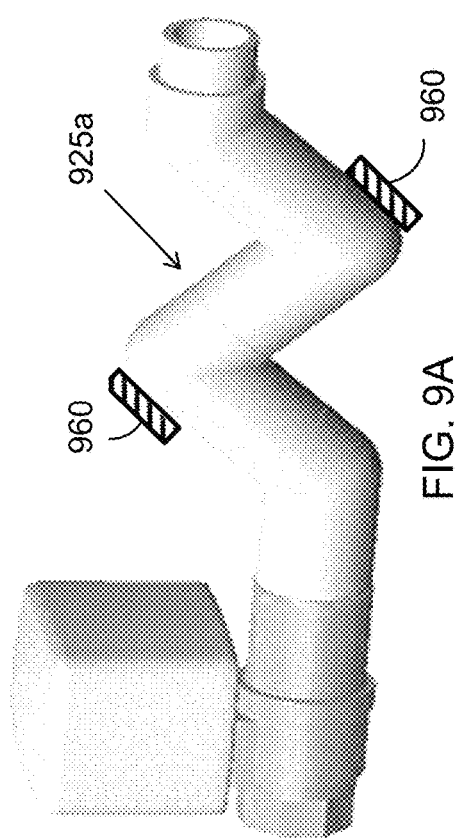
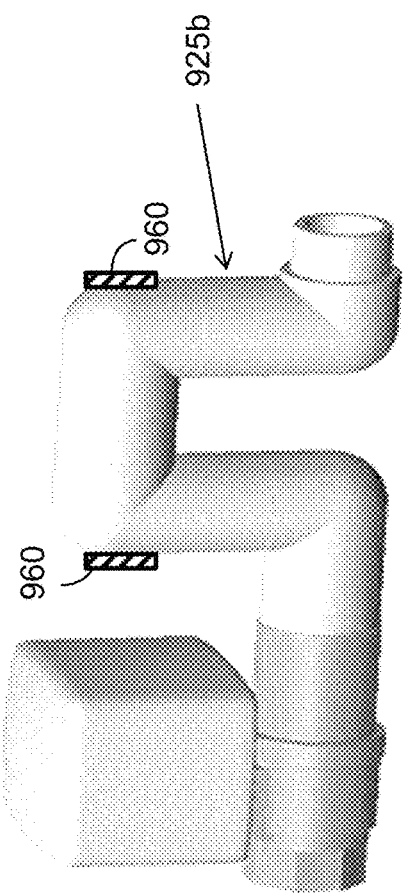
FIG. 9A
FIG. 9B

DEVICES AND SYSTEM FOR CHANNELING AND AUTOMATIC MONITORING OF FLUID FLOW IN FLUID DISTRIBUTION SYSTEMS

RELATED APPLICATION

This application is a continuation under 35 U.S.C. § 111(a) of International Application No. PCT/US2015/045320, filed Aug. 14, 2015, which claims the benefit under 35 U.S.C. § 119 of U.S. Provisional Application No. 62/037,511, entitled "Devices and System for Automatic Monitoring of Water flow in Plumbing Systems" and filed on Aug. 14, 2014. The entire contents of the foregoing applications are hereby incorporated herein by reference.

BACKGROUND

A rapidly rising global population is putting increasing pressure on natural resources. Demand for food, water, and energy is expected to rise by 30-50% over the next 20 years. Limited availability of water resources has implications for both the new development of real estate as well for the continued use of already-developed property.

New real estate development opportunities may be increasingly limited by water availability. Existing or anticipated water shortages may cause regulators to restrict or prohibit housing development. For example, the State of California currently requires water agencies to withhold approval for developments until a determination is made that sufficient water resources exist to serve a proposed development for a period of 20 years.

SUMMARY

According to at least one aspect, a fluid manifold is capable of channeling and monitoring fluid flow within a fluid distribution system that may be internal or external to a building, home or apartment. The manifold includes one or more input lumens. Each input lumen is associated with a respective inlet port. The manifold also includes a plurality of output lumens such that each output lumen is associated with a respective outlet port and at least one input lumen is coupled to two or more output lumens. The manifold also includes one or more fluid flow sensors capable of measuring fluid flow parameters of fluid flowing through at least one of the one or more input lumens and the plurality of output lumens. The fluid flow sensor(s) can be an ultrasonic flow sensor, hall effect flow sensor, electromagnetic flow sensor, or mechanical flow sensor.

BRIEF DESCRIPTION OF THE DRAWINGS

FIGS. 7A and 7B show diagrams illustrating a first crossover segment of a manifold similar to that shown in FIGS. 5A-5D and 6.

FIGS. 9A and 9B show diagrams illustrating other configurations of manifold output lumens.

DETAILED DESCRIPTION

A fluid distribution system can include fluid manifolds (such as water manifolds) capable of channeling fluid flowing within one lumen (such as a pipe) to a plurality of other lumens. According to the current disclosure, one or more flow sensors can be integrated in (or mounted to) a fluid manifold. The flow sensor(s) can allow for monitoring fluid flow rate, monitoring cumulative fluid usage, detecting fluid leaks or a combination thereof.

Figure 1A:
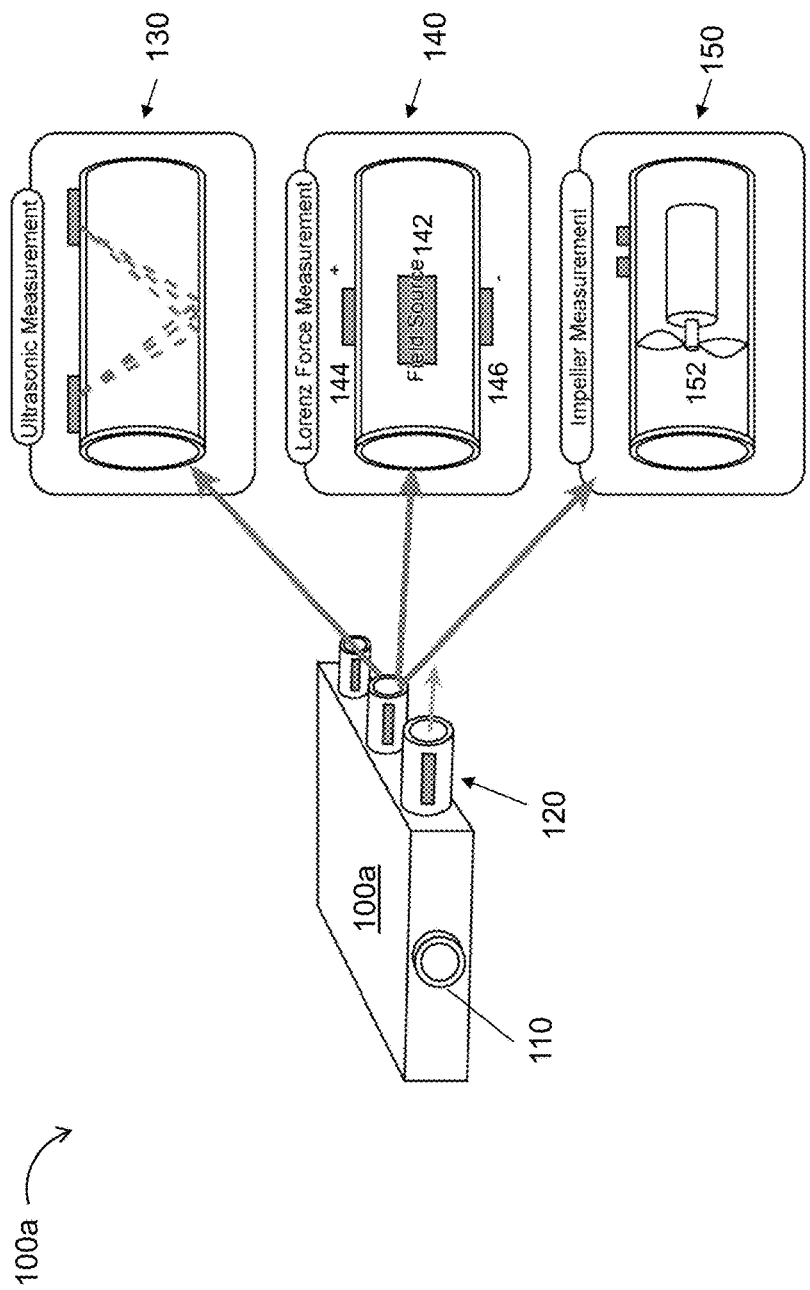
FIGS. 1A and 1B are conceptual diagrams of example multi-port fluid manifolds.

FIG. 1A is a conceptual diagram of an example multi-port fluid manifold 100 (such as a water manifold). The fluid manifold 100 includes an inlet port 110 and a plurality of outlet ports 120. While FIG. 1A shows a single inlet port 110, the manifold 100 generally can include one or more inlet ports 110 with each inlet port coupled to one or more respective outlet ports. Fluid can enter the manifold 100 via the inlet port 110 and flows out of the manifold 100 via the outlet ports 120. In a water distribution system, for instance, the inlet port 110 can be coupled to a water main line, service line or water heater (such as a heating ventilating and air conditioning (HVAC) boiler). In a gas distribution system, for instance, the inlet port 110 can be coupled to a gas main line or service line. The outlet ports 120 can be coupled to respective lumens (such as pipes) serving a plurality of destinations. For a water distribution system, such destinations can include internal or external irrigation systems, hose connections or plumbing systems within one or more apartments, rooms, devices (e.g., fixtures, appliances, or other devices), a kitchen, bathroom, laundry room or a combination thereof. For a natural gas distribution system, the destinations can include a stove, heater, chimney or a combination thereof. Pipes that can be coupled to the inlet port 110 and/or the outlet port 120 can include plastic pipes (such as cross linked polyethylene (PEX) pipes, polyvinyl chloride (PVC) pipes, Chlorinated PVC (CPVC) pipes, or other plastic pipes) or metal pipes (such copper pipes, stainless steel pipes, galvanized steel pipes or other metal pipes). Pipes can be coupled to the inlet port 110 and/or outlet ports 120 via respective pipe fittings (such as copper fittings, chrome fittings, black fittings, PVC fittings, bronze fittings, galvanized fittings, SHARKBITE®, Gaterbite, Pro-Bite, other push-fit plumbing fittings or other fittings) and/or pipe connectors such as copper connectors, carbonsteel connectors, PEX connectors, polybutylene (PB) connectors, SHARKBITE® connectors, push connectors, or other connectors) corresponding outlet ports 120, each of which can be connected to piping (e.g., PEX piping) via an optional quick connect fitting.

In some implementations, at least one of the inlet and outlet ports can be associated with an integrated flow sensor capable of measuring the flow rate of the fluid flowing into the inlet port(s) 110 or out of the outlet ports 120. As illustrated in FIG. 1A, flow sensors that can be integrated in (or mounted to) the manifold 100 can include ultrasonic sensors 130 (described below with respect to FIGS. 2 and 3), hall-effect sensors, Lorentz force (or magnetic) sensors 140, impeller sensors 150, other non-invasive or inline flow sensors, or a combination thereof. A Lorentz force sensor 140 can include a magnetic field source 142 disposed in-line with the fluid flow, such as within a branch coupling an inlet port 110 to one of the respective outlet ports 120. Charged particles in the fluid (such as water or natural gas) flowing past the magnetic field source 142 create an electric field that varies with the flow rate. Electrodes 144 and 146 arranged on opposite sides of the outlet port 120 can sense the variations in the electric field and therefore provide measurements that are indicative of the flow rate. Example impeller sensors 150 can include an impeller blade 152 disposed in-line with the fluid flow, such as within a branch coupling an inlet port 110 to one of the respective outlet ports 120. Fluid flowing past the impeller blade 152 causes the impeller blade 152 to spin at a rate proportional to the fluid flow rate. Alternative impeller sensors 150 may include positive displacement, mutating disk, multi-jet and turbine impellers as known in the art. An ultrasonic sensor (or ultrasonic flow meter) 130 can include two or more ultrasonic transducers (such as thin-film or disk piezoelectric transducers or CMUT MEMS sensors). Variations in propagation times of ultrasonic signals traveling through the fluid between distinct transducers can depend (e.g., can be linearly dependent) on the fluid flow rate. Measuring differences in signal propagation times (for instance between downstream and upstream signals or between zero-flow and upstream/downstream signals) allows for estimating corresponding fluid flow rate(s). Ultrasonic flow meters are described in further details with regard to FIG. 2.

Figure 1B:
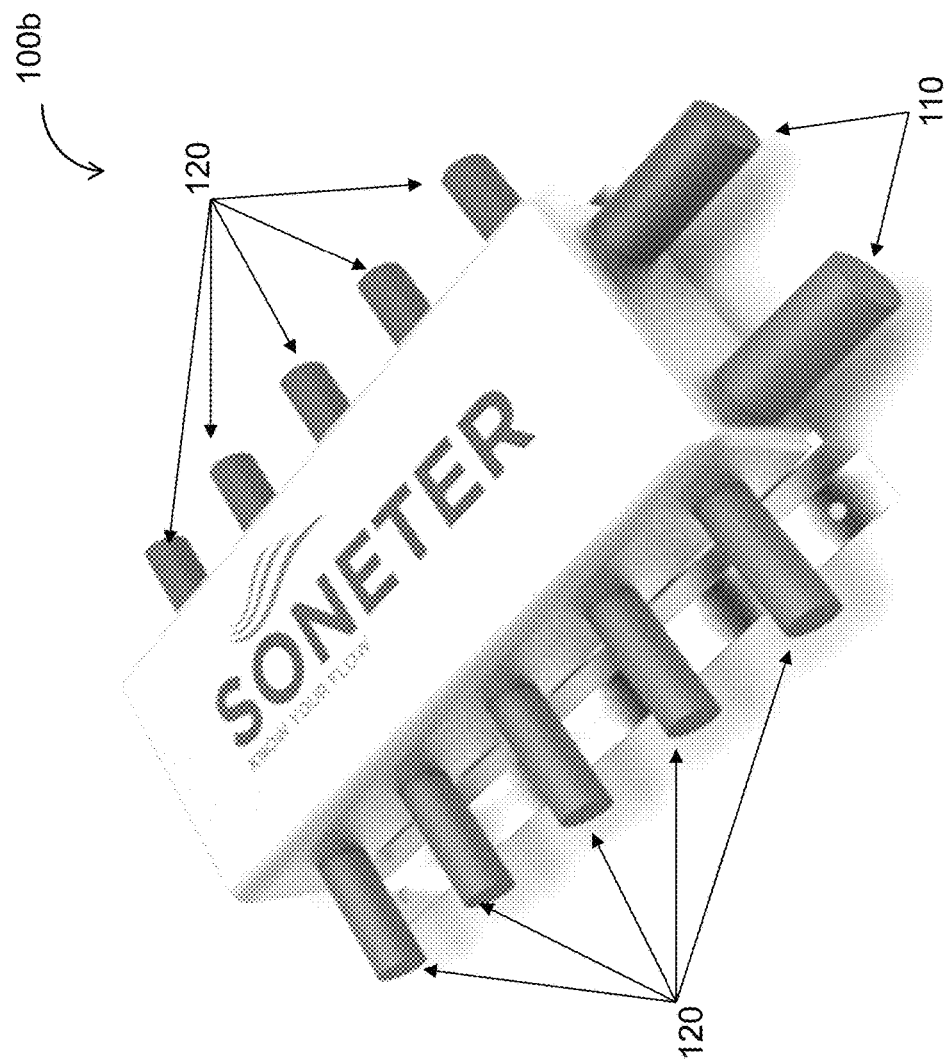

FIG. 1B shows an example manifold prototype 100b with two inlet ports 110, each of which is coupled to a respective plurality of (such as five) outlet ports 120. The manifold 100b can be employed as a water manifold such that one of the inlet ports 110 (and outlet ports 120 coupled thereto) can be employed to channel cold water while the other inlet ports 110 (and outlet ports 120 coupled thereto) can be employed to channel hot water. The manifolds 100a and 100b are referred to herein as manifold(s) 100. Manifolds described in this disclosure such as manifold 100) can be made of polyethylene (PE), polyvinyl chloride (PVC), copper, other material or a combination of various materials. In general, a manifold includes a lumen (or chamber with at least one inlet 110 port and two or more outlet ports 120.

In water distribution systems, manifolds control the distribution of and cold water by channeling water to different rooms and/or fixtures in a house, apartment building, shopping mall, or other structure. Larger structures, such as apartment buildings, may include multiple manifolds, e.g., one manifold per apartment. In some cases, a single manifold can be employed to distribute both hot and cold water through separate hot and cold manifold chambers (lumens). In other cases, a water distribution system can include separate hot and cold water manifolds (e.g., manifolds with a single inlet port 110 each). In either case, cold water enters the corresponding cold-water manifold, or manifold chamber, from the water main or service line, and hot water enters the corresponding hot-water manifold, or manifold chamber, from the water heater, which is also supplied by the water main or service line. The service line, water main, or water heater maintains water pressure in the manifold.

Typically, manifolds are installed near the water heater during construction for ease of access. Each manifold (or manifold chamber) includes multiple output ports (outlets) that connect to piping, such as cross-linked polyethylene (REX) piping or other type of piping. PEX piping can be connected to the manifold output ports via pipe connectors or pipe fittings as known in the art of plumbing. The piping can channel water from the manifold to rooms such as kitchen, bathroom and laundry room or to individual fixtures (such as sinks, dishwashers, showers, bath tubs, toilets) and appliances (such as washing machines and dish washers). In some implementations, at least one of the inlet ports 110 can include (or be coupled to) a gate valve (such as a shutoff valve) for stopping water flow into (and out of) the manifold. In some implementations, each outlet port 120 can include a respective gate valve, therefore, allowing to stop water from flowing out of each outlet port separately. For instance, if a particular fixture served by a respective outlet port 120 is under repair or the pipe coupled to the fixture breaks, the gate valve coupled to that outlet port can shut off the water flow towards that fixture. In some implementations, a subset of inlet and/or outlet ports of a valve can include (or be coupled to) respective gate valves. Gate valves can be controlled manually or automatically, e.g., in response to flow rate data collected by flow rate sensors integrated into (or mounted to) the inlet and/or outlet ports of the manifold. The number and size of the manifold output ports, type of fitting(s), type of gate valve(s), and type and size of piping can depend on the installation and/or the particular structure to where the manifold is to be installed.

Once the water manifold and piping are installed, the flow sensors associated with the water manifold can be activated to monitor water flow to the fixtures throughout the structure. In some implementations, each outlet port can be associated with (e.g., include or be coupled to) a respective flow sensor such as an ultrasonic flow sensor or an impeller-based flow sensor. The manifold can also include additional flow sensor(s) associated with the inlet port(s) for measuring water entering the manifold from the service line or water heater.

Figure 2:
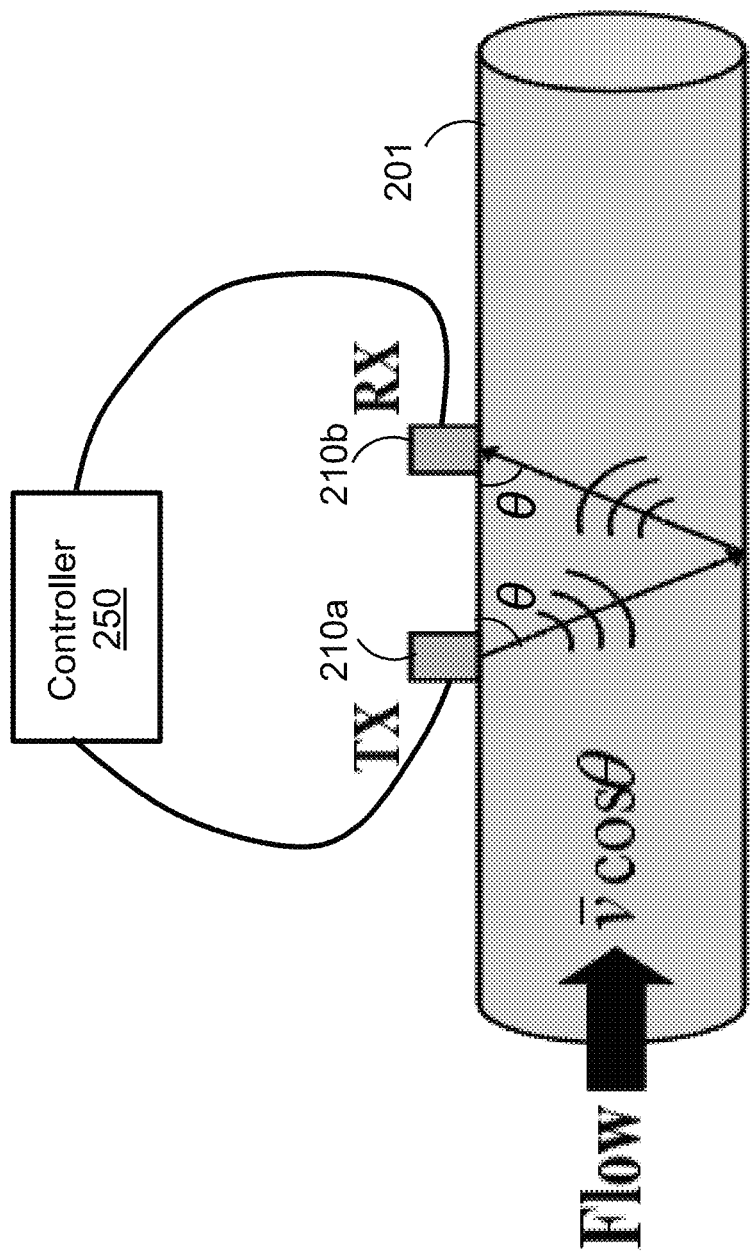
FIG. 2 shows a diagram illustrating ultrasonic signal propagation between ultrasonic transducers of a fluid meter.

FIG. 2 shows a diagram illustrating ultrasonic signal propagation between ultrasonic transducers of a fluid meter. The fluid meter includes a pair of transducers 210a and 210b (also referred to hereinafter as transducer(s) 210) and a controller 250 coupled thereto. The transducers 210 can be mounted in a non-invasive or invasive manner to the wall of a lumen 201 (such as a tailpiece or a pipe). The controller 250 can be a microprocessor, microcontroller, microchip, application-specific integrated circuit (ASIC), digital signal processor (DSP), specialized analog circuit or a combination thereof. The controller 250 can be part of or coupled to the fluid meter. The controller 250 can be configured to access signals transmitted or received by the transducers 210 and compute fluid flow parameter values such as flow or flow rate) based on the accessed signals.

Each transducer 210 can be oriented at an angle θ with respect to the lumens longitudinal axis. The configuration (e.g., the orientation and the relative placement with respect to the wall of the lumen) of the transducers 210 can define the propagation direction of ultrasonic signals transmitted or received by the transducers 210. According to a "V" configuration (as shown in FIG. 2), an ultrasonic signal transmitted by the transducer 210a can propagate at the same direction (e.g., at an angle θ with respect to the lumen longitudinal axis) as the orientation of the transducer 210a, reflect back from the inside of the inner wall of the lumen 201 and be received by the transducer 210b at a direction defined by the orientation of the transducer 210b. According to a "W" configuration, an ultrasonic signal transmitted by a first transducer 210 can exhibit three reflections off the inner wall of the lumen 201 before reaching the second transducer 210. In some implementations, the transducers 210 can be arranged across each other such that the ultrasonic signals propagate directly (without wall reflections) from one transducer 210 to the other. For instance, according to a "Z" configuration, the transducers 210 can be arranged across each other on the outer wall of the lumen 201. In some implementations, each of the transducers 210 can be configured to operate alternately as a transmitter and receiver. In some implementations, one of the transducers 210 can be configured to operate as a dedicated transmitter, while the other transducer 210 can be configured to operate as a dedicated receiver.

A transmit (TX) transducer (e.g., transducer 210a) can transmit a high-frequency burst, or pulse, into the lumen 201 and a receive (RX) transducer (e.g., transducer 210b) can receive a version of the pulse after some time delay (with respect to transmit time). The time delay between the transmit time (e.g., time at which transmission of the pulse starts) and the receive time (time at which reception by the RX transducer starts) represents the propagation time of the transmitted signal between the TX and RX transducers 210. The signal propagation time depends on the fluid flow velocity. For instance, the propagation time of a signal propagating upstream (against fluid flow) is longer than the propagation time of a signal propagating in no-flow fluid. Also, the propagation time of a signal propagating downstream (along fluid flow) is shorter than the propagation time of a signal propagating in no-flow fluid.

In some implementations, the increase in signal propagation time (for instance with respect to signal propagation time in a no-flow state) due to fluid flow velocity can be linearly dependent on (or linearly proportional to) the velocity of the fluid. For water flowing within pipes, such linearity is satisfied at least for a range of flow rates such as from about 0 gallons per minute (GPM) to about 1 GPM, ¾ GPM, ½ GPM, ¼ GPM or other flow rate values greater than (or less than) 1 GPM. As such, fluid flow velocity can be computed based on measured signal propagation times. Also, given that flow rate is linearly dependent on the flow velocity and the cross sectional area of the lumen 201, the fluid flow rate can be computed based on respective measured signal propagation time(s). In some implementations, the controller 250 can determine the fluid flow rate (or fluid flow velocity) based on measured signal propagation time using a lookup table (LUT). Using a LUT can allow for determination of the fluid flow rate based on measured signal propagation time even if the relationship between the increase in signal propagation time (due to fluid flow) and the flow rate is nonlinear.

In some implementations, the controller 250 can determine the signal propagation time based on cross-correlation values between the RX signal (or samples thereof) and delayed versions of a waveform representing the TX signal. For instance, the controller 250 can determine the signal propagation time to be equal to the time delay of the delayed version of the transmitted waveform associated with the maximum cross-correlation value. In some implementations, the controller 250 can determine the signal propagation time based on cross-correlation values between the RX signal (or samples thereof) and a plurality of templates such that each template corresponds to a respective value of the signal propagation time. The templates can be representations of delayed and/or filtered versions of the waveform. For instance, in generating the templates, the waveform can be filtered in a way to reflect potential distortions (caused by the fluid, the transducers, the tailpiece or a combination thereof) associated with the RX signal. In some implementations, a plurality of filters may employed such that a separate filter is used to generate a respective subset of templates. In some implementations, the controller 250 can determine the signal propagation time by measuring the time difference between transmit time and the time at which the RX signal crosses a predetermined threshold value at the receiving transducer (e.g., transducer 210b). The controller 250 can also determine the signal propagation time by measuring the difference in phase, or phase delay, between the transmitted and received signals.

The controller 250 can compute the fluid flow velocity or fluid flow rate using the difference in signal propagation times associated with a signal transmitted upstream and a signal transmitted downstream. In such case, each of the transducers 210 can be configured to operate alternately as transmitter and receiver. The controller 250 can also compute the fluid flow velocity or fluid flow rate using the difference in signal propagation times associated with a signal transmitted upstream (or downstream) and a signal transmitted in a no-flow fluid state. In some implementations, both time differences are linearly dependent on the fluid flow velocity and fluid flow rate. The controller 250 can determine the difference in signal propagation times associated with upstream and downstream signals (or upstream and zero-flow signals or downstream and zero-flow signals) by computing cross-correlation values between respective upstream and downstream RX signals. In some implementations, the controller 250 can determine the difference in signal propagation times associated with upstream and downstream signals (or upstream and zero-flow signals or downstream and zero-flow signals) by computing difference in phase between such signals in the frequency domain.

In some implementations, the ultrasonic fluid meter can include (or be coupled to) an analog-to-digital converter (ADC) configured to sample received ultrasonic signals. A processor (such as a DSP) can then process the sampled signals to determine fluid flow velocity or fluid flow rate. In determining the fluid flow velocity or fluid flow rate, the processor can be configured to perform filtering, cross-correlation, zero-crossing, phase-based methods based on FFT or Goertzel algorithm, template matching or a combination thereof. In some implementations, the ultrasonic fluid flow meter can include a custom application specific integrated circuit (ASIC) configured to perform the zero-crossing or phase detection techniques for differential time-of-arrival estimation directly.

In some implementations, the fluid flow meter can include more than two transducers. For instance, the fluid flow meter can include multiple transducer pairs such that each transducer pair is mounted in association with a respective inlet or outlet port of a manifold (such as manifold 100). The transducer pairs can be coupled to the controller 250. The controller 250 can determine fluid flow parameters (such as flow rate or flow velocity) for various inlet and/or outlet ports based on RX signals received by transducers associated with each inlet or outlet port. For instance, using RX signals for a pair of transducers mounted in association with an outlet port of a manifold, the controller 250 can determine the flow velocity or flow rate through that outlet port. The transducers can be mounted to (or integrated into) a manifold according to invasive or non-invasive settings. The controller 250 can be embedded within a casing (or housing) of the manifold or can be arranged outside the manifold casing.

The practicality and functionalities of a manifold (such as a water manifold) can vary significantly based on respective design parameters and features, such as the number of inlet and outlet ports of the manifold, the size of the manifold, the sensors and/or other devices integrated in (or coupled to) the manifold and/or the material of the manifold. For instance, water manifolds are typically installed between wall studs. As such, a water manifold that is "too wide" can lead to undesired digging (or cutting) through wall studs when plumbing the manifold. Also, as the number of inlet and/or outlet ports per manifold increases, a smaller number of manifolds can be employed per fluid distribution system, therefore, leading to simpler plumbing. Also, manifolds can become "smart" with integrated sensors, processors, communication interfaces or other electronic/electromechanical devices. "Smart" manifolds can allow for automatic fluid consumption monitoring, leak detection, or remote control of fluid flow directed to separate apparatuses such as fixtures and/or appliances associated with a fluid distribution system.

Figure 3A:
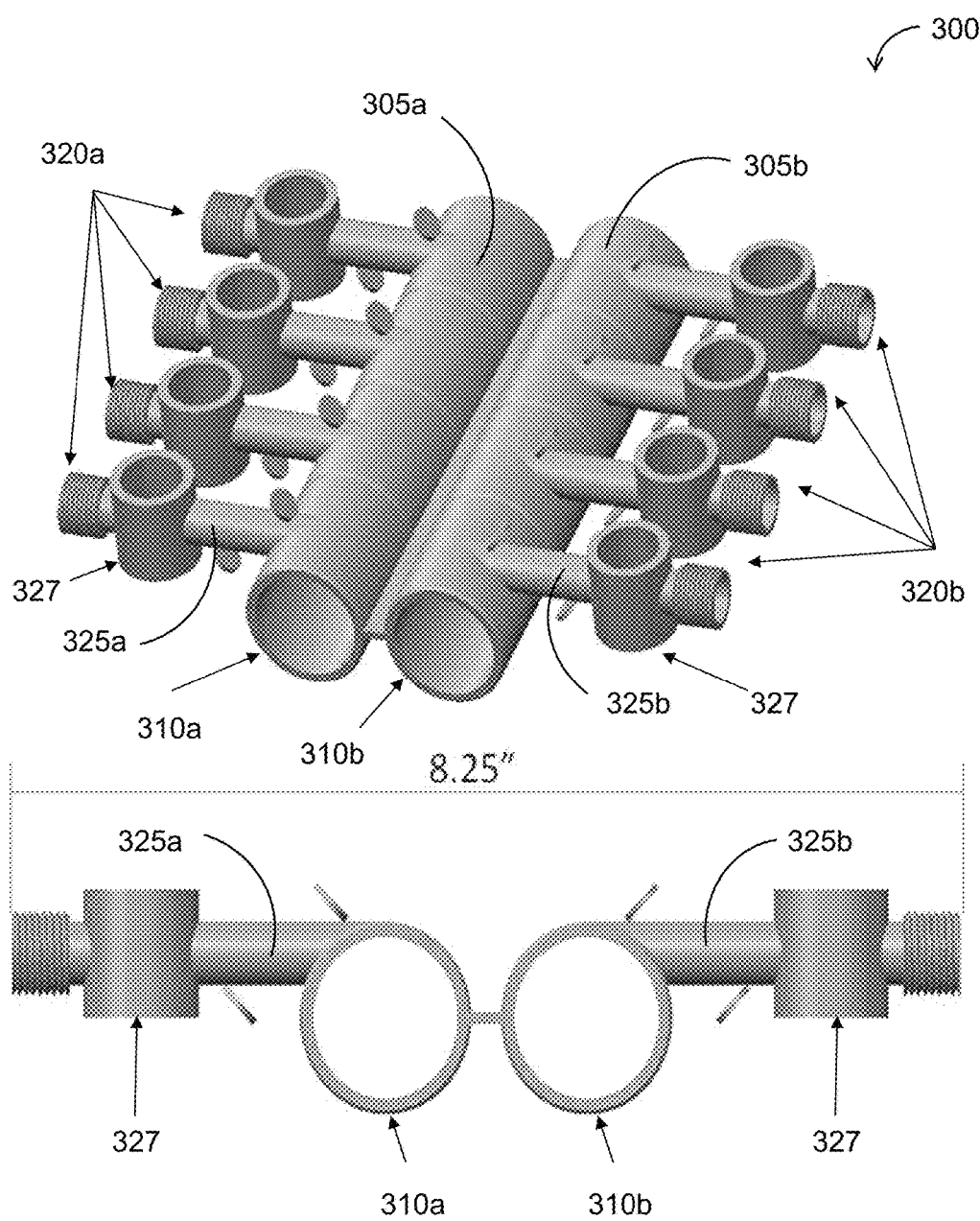
FIGS. 3A and 3B show diagrams illustrating a first example manifold 300 and a respective approach for mounting transducer blocks thereon.
Figure 3B:
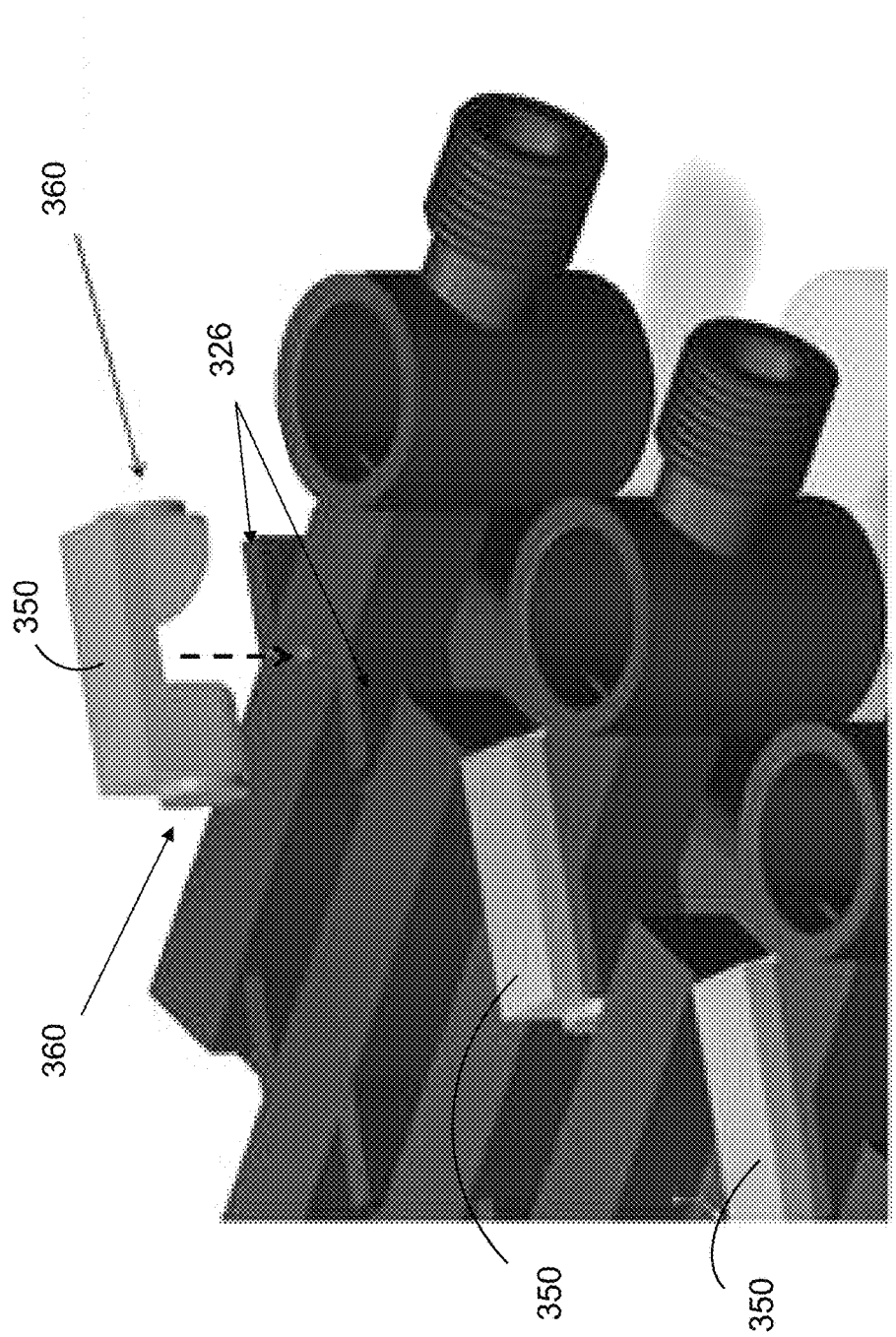

FIGS. 3A and 3B show diagrams illustrating a first example manifold 300 and a respective approach for mounting transducer blocks thereon. The manifold 300 includes two inlet chambers 305a and 305b (also referred to herein individually or in combination as inlet chamber(s) 305 or inlet lumen(s) 305) associated with two respective inlet ports 310a and 310b (also referred to herein individually or in combination as inlet port(s) 310). The inlet chambers 305a and 305b can be arranged one alongside the other (e.g., substantially in parallel to each other). The inlet chamber 305a is coupled to a respective plurality of outlet ports 320a through respective output branches 325a. The inlet chamber 305b is coupled to a respective plurality of outlet ports 320b through respective output branches 325b. The output branches 325a and 325b are also referred to herein, individually or in combination, as output branch(es) 325. The outlet ports 320a and 320b are also referred to herein, individually or in combination, as outlet port(s) 320.

In the manifold 300, the output branches 325a (coupled to inlet chamber 305a) are arranged to extend in a direction away from both inlet chambers 305a and 305b such that the respective outlet ports 320a are arranged on the same side as the inlet chamber 305a to which they are coupled. Also, the output branches 325b (coupled to inlet chamber 305b) are arranged to extend away from both inlet chambers 305a and 305b such that the respective outlet ports 320b are arranged on the same side as the inlet chamber 305b to which they are coupled. In some implementations, each output branch can include (or be associated with) a respective manual or automatic shutoff valve (not shown in FIGS. 3A and 3B). The shutoff valves can be arranged within the transverse cylindrical structures 327. Each output branch 325 can include two snap elements 326 that form a "Z" shape together with that output branch 325. As shown in FIG. 3B, a transducer block 360 can be mounted onto an output branch 325 between the respective two snap elements 326. That is, a transducer block 360 can be positioned onto the output branch 325 between the respective snap elements 326. As such, the transducers 360 associated with the transducer block 350 are arranged across each other on opposite sides of the output branch 325 in accordance with a "Z" configuration. The snap elements 326 are capable of snapping (or arranged to snap) onto the transducer block 350.

Arranging the transducers 360 across each other on opposite sides of the output branch 325 allows for respective ultrasonic signals to travel directly from one transducer 360 to another across the fluid in the output branch 325 without reflecting from the inner wall of the output branch 325. In some implementations, the transducer block 350 can be mounted to the output branch 325 such that respective ultrasonic signal path is at about 45 degrees with respect the longitudinal axis of the output branch 325. For instance, the angle between the signal path and the longitudinal axis of the output branch 325 can be between 30 to 60 degrees. In some implementations, the angle between the signal path and the longitudinal axis of the output branch 325 can be greater than zero and smaller than 90 degrees. In some implementations, the transducers 360 can be mounted to the output branches 325 according to a "V" configuration or any other configuration known in the art.

Figure 4:
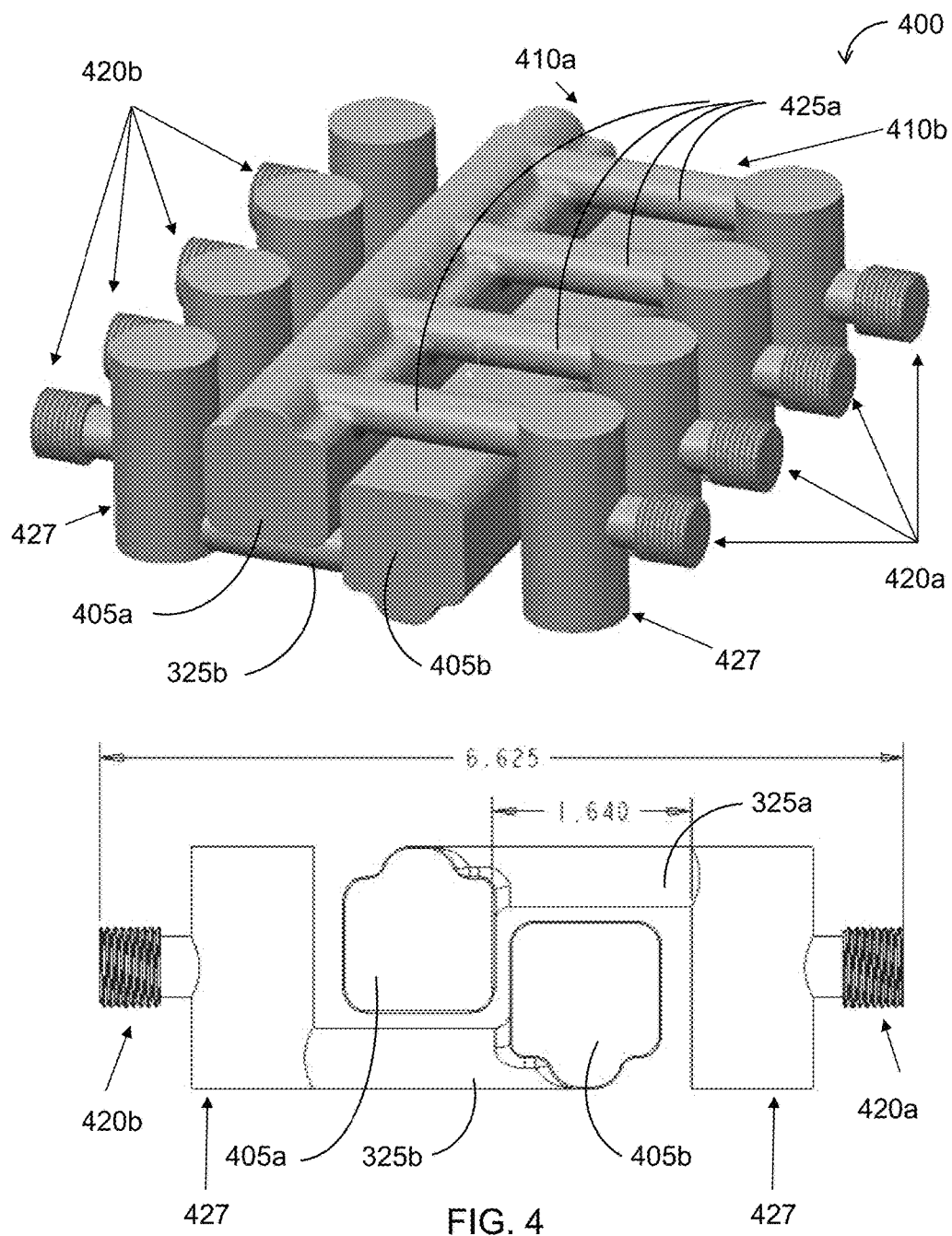
FIG. 4 shows a diagram of a manifold with an over-under crossover configuration.

FIG. 4 shows a diagram of a manifold 400 with an over-under crossover configuration. The manifold 400 includes two input chambers (or input lumens) 405a and 405b (also referred to as input chamber(s) 405) that are arranged one alongside the other. Each of the inlet chambers 405a and 405b is associated with a respective inlet port 410a or 410b. The input chamber 405a is coupled to a respective plurality of outlet ports 420a through respective output branches 425a. The output branches 425a extend from the respective input chamber 405a across (e.g., over or under) the other input chamber 405b such that the respective outlet ports 420a are arranged on the side of the input chamber 405b. The input chamber 405b is coupled to a respective plurality of outlet ports 420b through respective output branches 425b. The output branches 425b extend from the respective input chamber 405b across (e.g., over or under) the other inlet chamber 405a such that the respective outlet ports 420b are arranged on the side of the input chamber 405a. The crossover configuration (i.e., output branches for one inlet chamber extending across the other inlet chamber) allows for a narrower manifold (i.e., smaller width) compared to a non-crossover configuration as shown in FIG. 3A. For instance, while the manifold 300 is 8.25 inches wide, the manifold 400 is only 6.625 inches wide. Reducing the width of a manifold, for instance, without reducing the number of respective inlet or outlet ports, can reduce the space occupied by that manifold when installed and therefore simplify the respective plumbing process. In other words, reducing the width of the manifold decreases the chances of any undesired drilling through wall studs or any other structures allowing the manifold to be placed in areas that are space constrained and distributed throughout the plumbing system (for example, under a sink, behind a washer, below the floor where space is constrained.

In some implementations, each output branch 425 can include (or be associated with) a respective manual or automatic shutoff valve (not shown in FIG. 4). The shutoff valves can be arranged within the transverse cylindrical structures 427. In some implementations, ultrasonic transducers such as transducers 360) can be mounted to one or more of the output branches 425 according to a "Z" configuration, a "V" configuration, or other configuration known in the art. In some implementations, ultrasonic transducers can be mounted to at least one of the inlet chambers 405a and 405b.

Figure 5A:
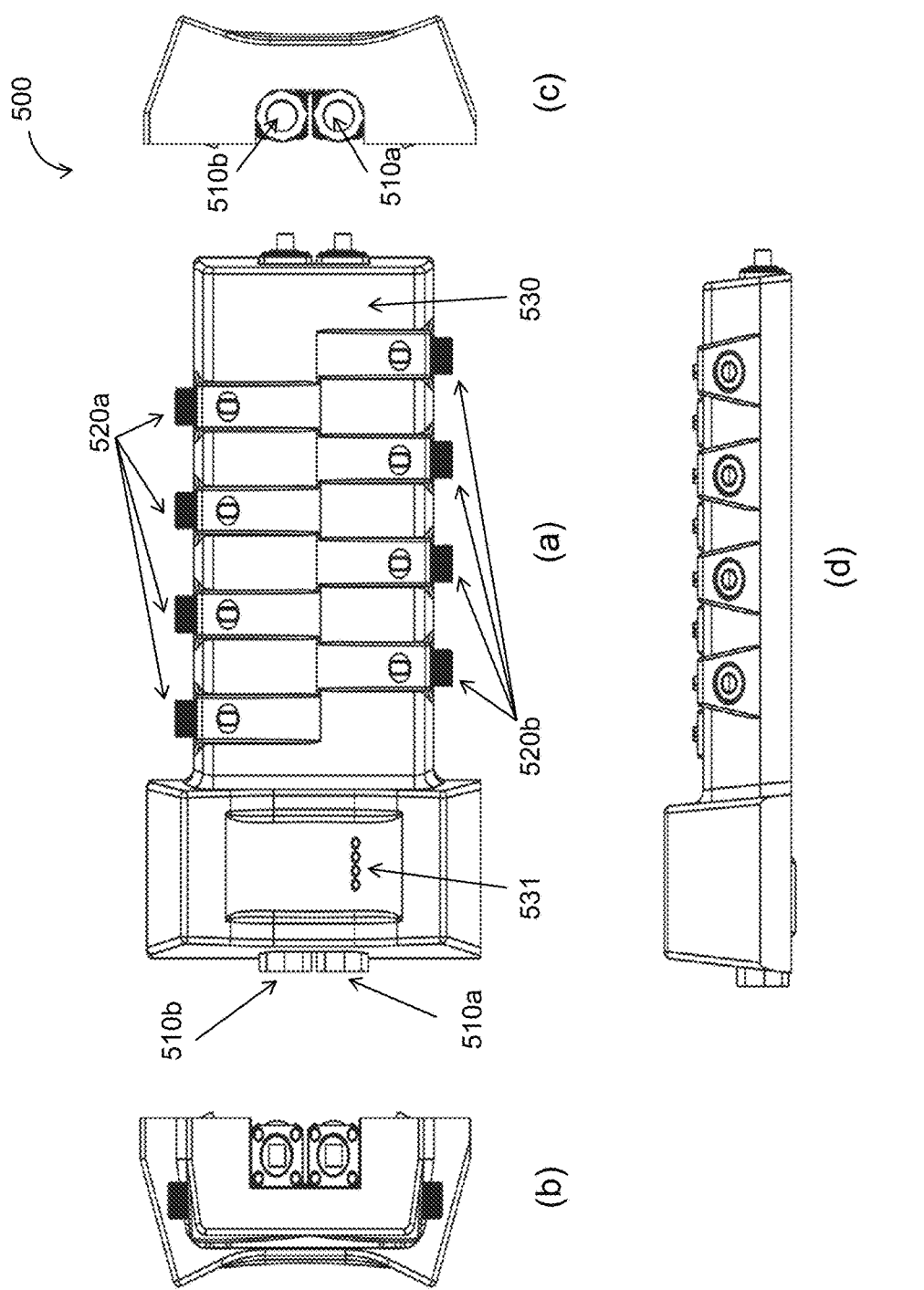
FIGS. 5A and 5B show diagrams illustrating various views of a manifold with another crossover configuration.
Figure 5B:
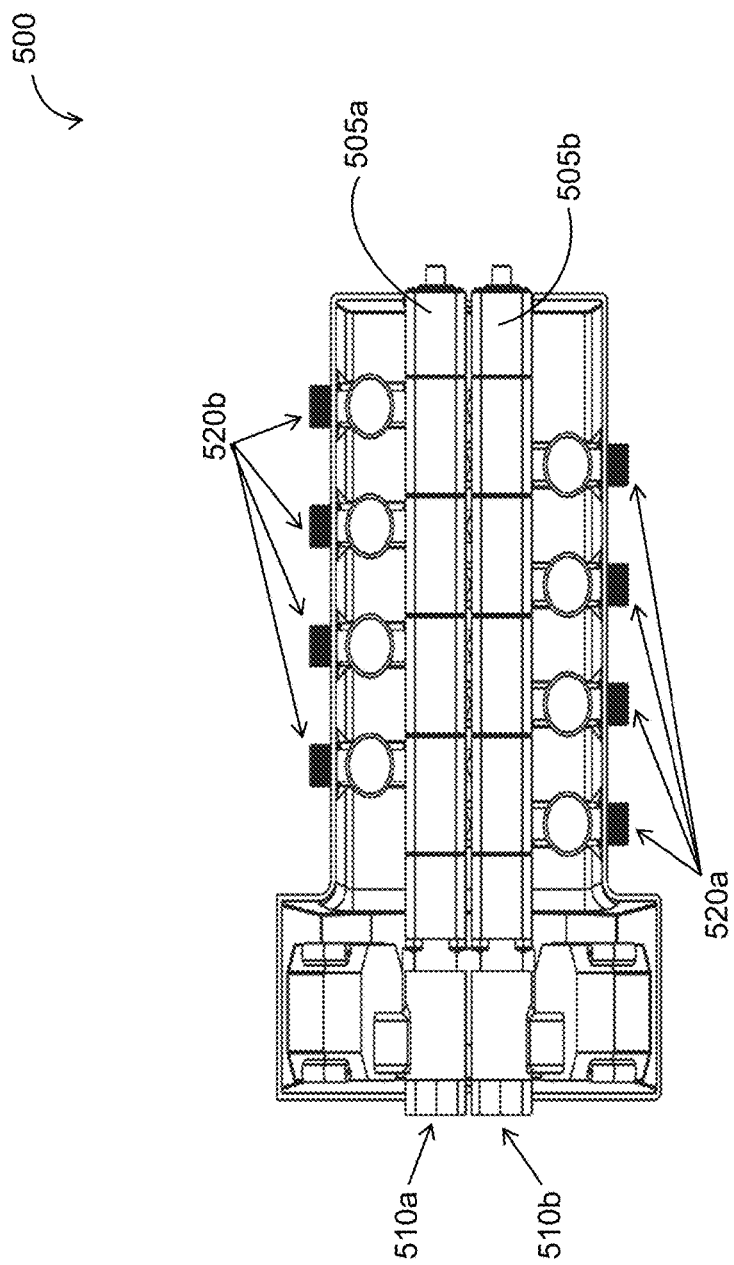

FIGS. 5A and 5B show diagrams illustrating various views of a manifold 500 with another crossover configuration. In FIG. 5A, the drawing (a) represents atop view of the manifold 500 while drawings (b) through (d) represent distinct side views of the same manifold 500. FIG. 5B shows a bottom view of the manifold 500. The manifold 500 includes two inlet chambers (or inlet lumens) 505a and 505b arranged one alongside the other. Fluid (such as water) can flow into inlet chamber 505a through the respective inlet port 510a and into inlet chamber 505b through the respective inlet port 510b. The inlet chamber 505a is coupled to a respective plurality of outlet ports 520a arranged on an opposite side of the manifold 500 from the inlet chamber 505a. The inlet chamber 505b is coupled to a respective plurality of outlet ports 520b arranged on an opposite side of the manifold 500 from the inlet chamber 505b. That is, output branches coupling inlet chamber 505a to respective outlet ports 520a are arranged to crossover (or extend past) inlet chamber 505b towards respective outlet ports 520a. Also, output branches coupling inlet chamber 505b to respective outlet ports 520b are arranged to crossover (or extend past) inlet chamber 505a towards respective outlet ports 520b. The output branches coupling the inlet chambers 505a and 505b to respective outlet ports 520a and 520b, respectively, are hidden in FIGS. 5A and 5B by the manifold cover (or manifold housing) 530.

Figure 5C:
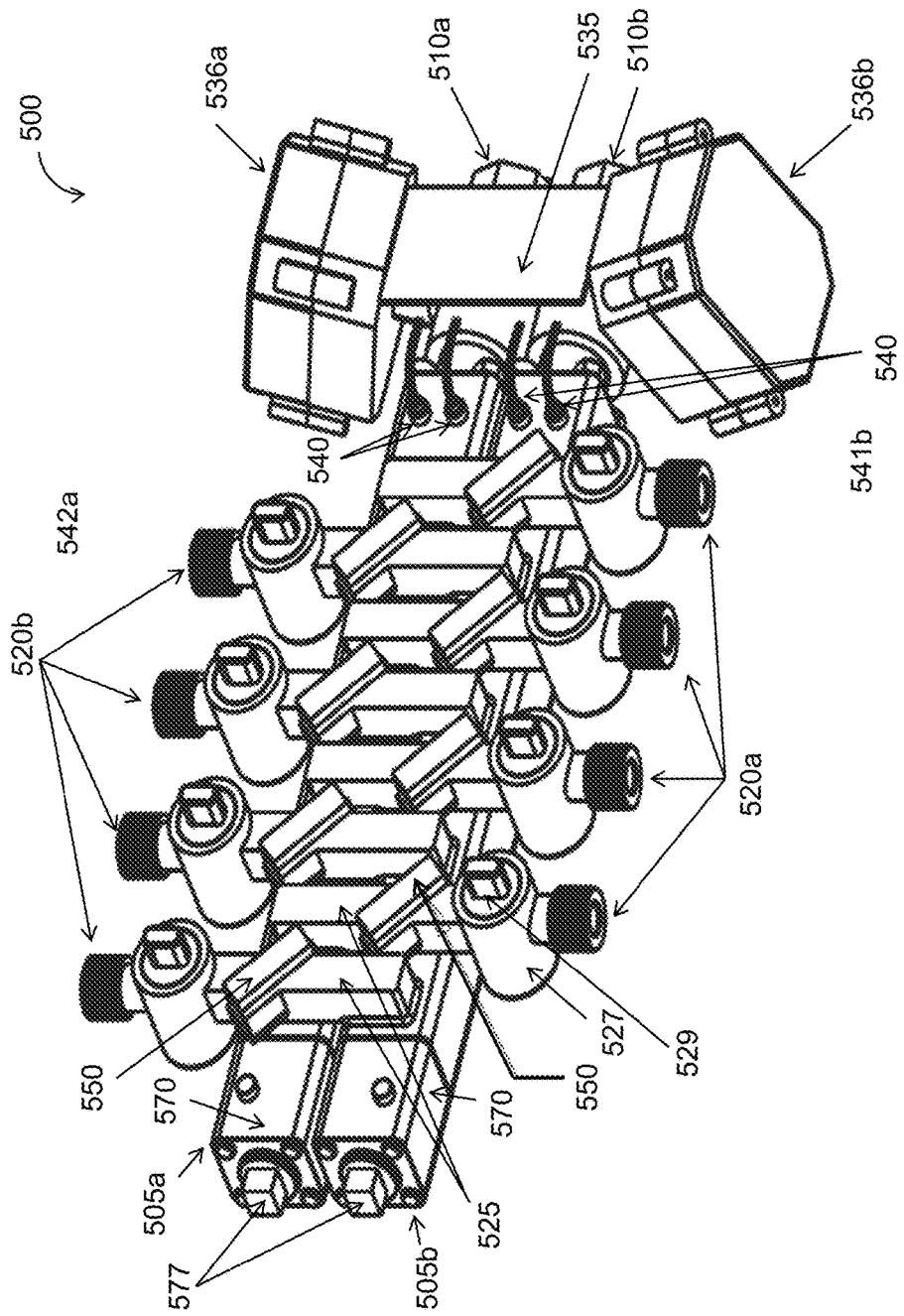
FIGS. 5C and 5D show diagrams of the manifold 500 in FIGS. 5A and 5B without the manifold cover.
Figure 5D:
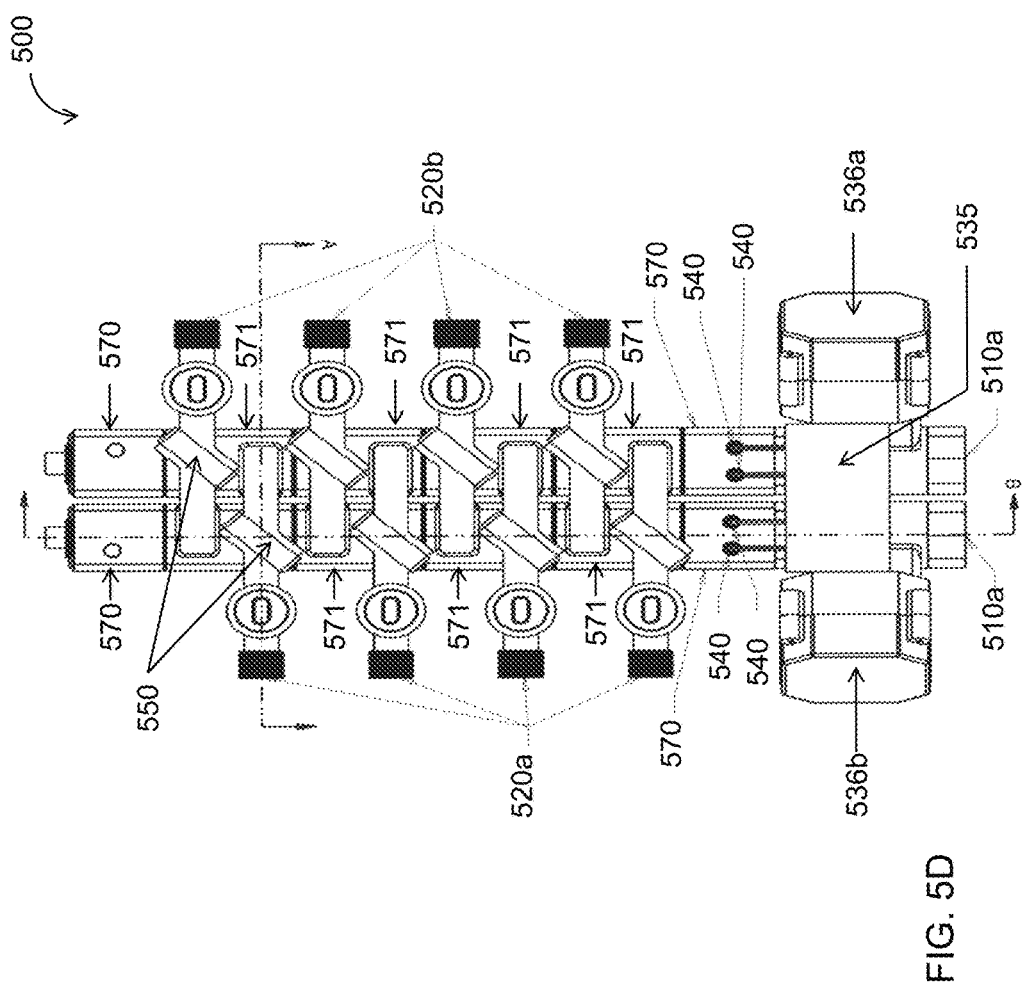

FIGS. 5C and 5D show diagrams of the manifold 500 in FIGS. 5A and 5B without the manifold cover. The manifold 500 can include a circuit board 535 (e.g., including processor(s), ADC(s) and/or other circuit components). The manifold 500 can include one or more sensors 540, such as pressure sensor(s), water quality sensor(s), fluid temperature sensor(s) or other types of sensors. For instance, a pressure sensor and a water quality sensor can be integrated in each of the inlet lumens 505a and 505b. In some implementations, pressure sensors (and/or other sensors) can be integrated in association with the outlet ports 520a and 520b (such as integrated within respective output branches 525). In some implementations, the manifold 500 can include shutoff valves 536a and 536b (such as electromechanical shutoff valves) for controlling fluid flow through the inlet lumens 505a and 505b. For instance, the shutoff valve 536a can control fluid flow through inlet lumen 505a, while the shutoff valve 536b can control fluid flow through inlet lumen 505b. In some implementations, the manifold 500 can include shutoff valves 529 (such as ¼ turn shutoff valves) integrated in association with the output branches 525. For instance, each output branch 525 can include a transverse cylindrical structure 527 for housing a shutoff valve 529. In some implementations, the shutoff valves 529 can be integrated with the output branch through other mechanisms know in the art. In some implementations, the shutoff valves 529 can be automatic shutoff valves controlled by one or more control circuits or controllers).

In some implementations, the manifold 500 can be manufactured as a plurality of components that can be assembled together to form the manifold 500. Each of the inlet lumens 505a and 505b can include a plurality of lumen segments, or modules, such as adapter segments 570 and crossover segments 571) assembled into a respective lumen (or chamber). Each crossover segment 571 includes a respective output branch 525 coupled thereto and providing a respective outlet port such as outlet port 520a or 520b). For each crossover segment 571, a respective transducer assembly (or transducer block) 550 can be mounted to the output branch 525 of that crossover segment 571. The transducer assembly 550 can include two or more transducers that are coupled (e.g., through electric wires) to the circuit board 535. Adapter segments 570 can be arranged at both ends of a lumen (such as inlet lumen 505a and 505b). In some implementations, adapter segments 570 can be arranged between crossover segments 571. In some implementations, one or more sensors 540 can be integrated within (or coupled to) a segment 570 (for instance, the segment 570 that is nearest to the respective inlet port 510a or 510b). Plugs (such as national pipe thread (NPT) plugs) 577 can be employed to shut the end ports of the lumen segments 570 arranged at the end of the inlet lumens 505a and 505b, therefore, providing terminations of such lumens. These lumens may be extended with modules to control water flow for external systems such as lawn irrigation systems allowing for a complete "smart plumbing" system that can measure flow, accumulation and leaks in irrigations systems external to the building, single-family home or apartment. The manifold 500 (or a processor thereof) can be coupled to a communication network through wired or wireless communication capabilities (such as antenna, communication interface, etc.). The manifold 500 can access the Internet, through the communication network, to obtain external data such as weather data to control external irrigation system and water amounts.

Figure 6:
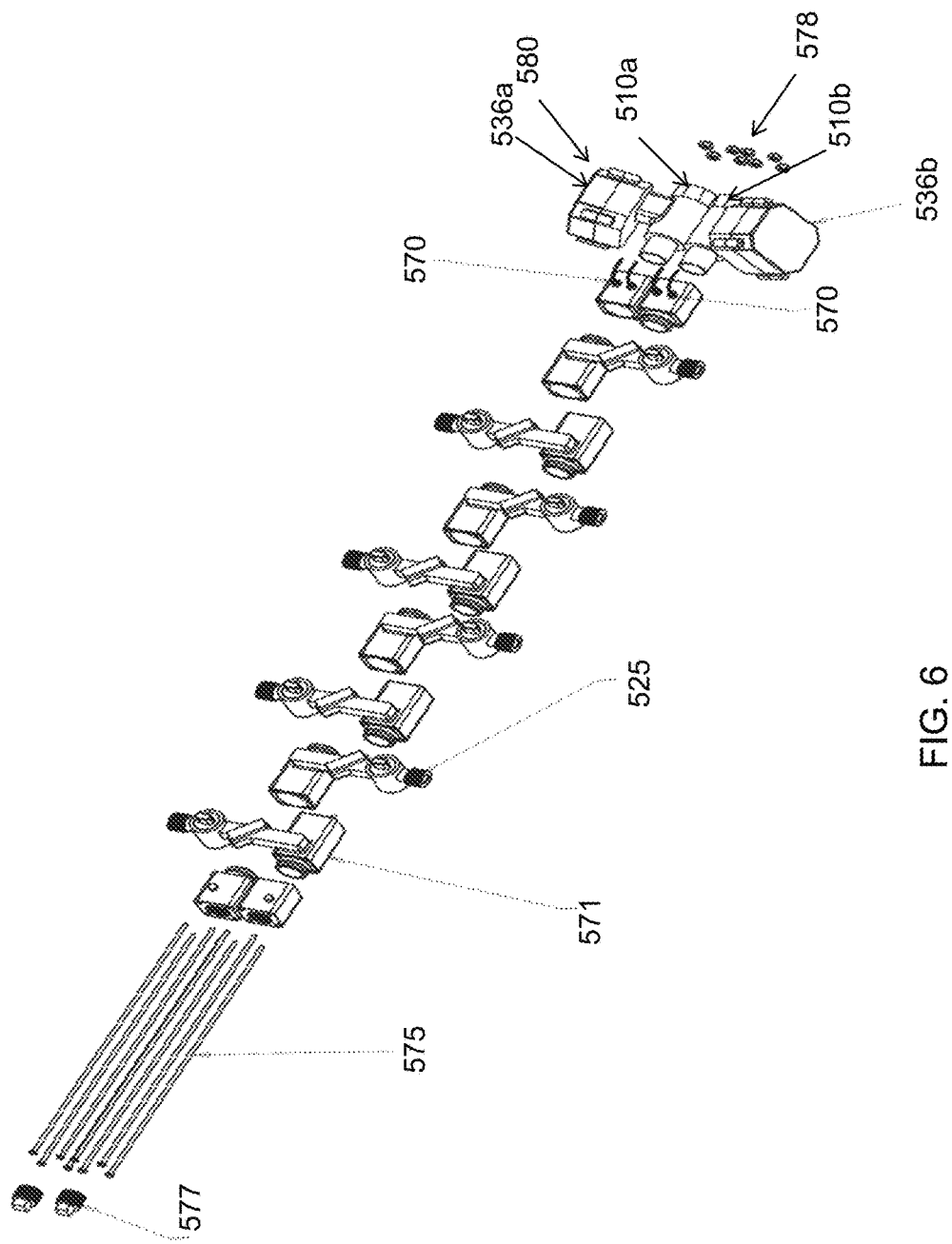
FIG. 6 shows a diagram illustrating assembly of the manifold shown in FIGS. 5A-5D.

FIG. 6 shows a diagram illustrating assembly of the manifold 500 shown in FIGS. 5A-5D. For each lumen (such as inlet lumen 505a or 505b), the respective adapter segments 570 and the respective crossover segments 571 can be held together through one or more rods 575. In some implementations, each lumen segment (such as adapter segment 570 and crossover segment 571) can include one or more holes running longitudinally across the lumen segment. For instance, each lumen segment can include four longitudinal holes at four respective corners. When a set of lumen segments are aligned together longitudinally, the respective longitudinal holes are also aligned with each other. The rods 575 can go through the aligned holes from one end of the manifold 500 all the way to the other end (e.g., to side of the inlet ports 505a and 505b). At the other end of the manifold 500 (e.g., to side of the inlet ports 505a and 505b), locking nuts 578 can be employed at the ends of the rods 575 to compress and hold the respective manifold assembly together. For instance, the rods 575 can be threaded at one end in order to be able to engage the locking nuts 578.

As shown in FIG. 6, the inlet ports 510a and 510b of the manifold 500 can be coupled to each other, such as both inlet ports can be part of a single component 580. In some implementations, the component 580 can include the inlet ports 510a and 510b) and respective shutoff valves 536a and 536b. When assembling the manifold 500, a separate set of lumen segments (such as adapter segments 570 and crossover segments 571) can be aligned with and coupled to a respective inlet port (of the inlet ports 510a and 510b), therefore, resulting into two inlet lumens 505a and 505b that are arranged alongside each other and are coupled to the inlet ports 510a and 510b, respectively.

FIGS. 7A and 7B show diagrams illustrating a first crossover segment 700 for use in a manifold 500 similar to that shown in FIGS. 5A-5D and 6. The crossover segment 700 includes a hollow component 710 and an output branch 725 providing a respective outlet port 720. The hollow component 710 represents a portion of the inlet lumen of the respective assembled manifold 500. The hollow component 710 provides a threaded cylindrical portion 715 for engaging another crossover segment 700 or an adapter segment such as adapter segment 570 shown in FIGS. 5D and 6). The output branch 725 is coupled to the hollow component 710 and provides a respective outlet port 720. The output branch 725 provides a fluid flow path to the respective outlet port 720 from the hollow component 710. At the end of the output branch 725, the outlet port 720 includes a threaded cylindrical portion 726 capable of engaging a pipe, pipe fitting or pipe connector.

The output branch 725 can include two snap elements 723 that are arranged to form a "Z" shape together with the output branch 725. The snap elements 723 are arranged to hold a respective transducer assembly 750. The transducer assembly 750 can include a transducer block (or transducer saddle) 755 that is arranged to snap fit into the "Z" configuration formed by the two snap elements 723 and the output branch 725. The transducer block 755 is capable of holding a pair of ultrasonic transducers 760. When the transducer block 755 is mounted on the output branch, the transducers 760 are arranged across each other on different sides of the output branch 725. As such, ultrasonic signal can propagate directly from one transducer 760 to another across the output branch 725 without necessarily reflecting from the inner wall of the output branch 725. The transducer block 755 can be made of a polymer or other material.

The output branch 725 can also include a shutoff valve 772 arranged transverse to the longitudinal axis of the output branch 725. For instance, the output branch 725 can include a cylindrical structure 771 (or a hole within the output branch wall) for housing the shutoff valve 772. In some implementation, the shutoff valve can be a manual valve (such as a ¼ turn valve). In some implementations, the shutoff valve 772 can be an electromechanical valve controlled by a control circuit.

Figures 8A, 8B:
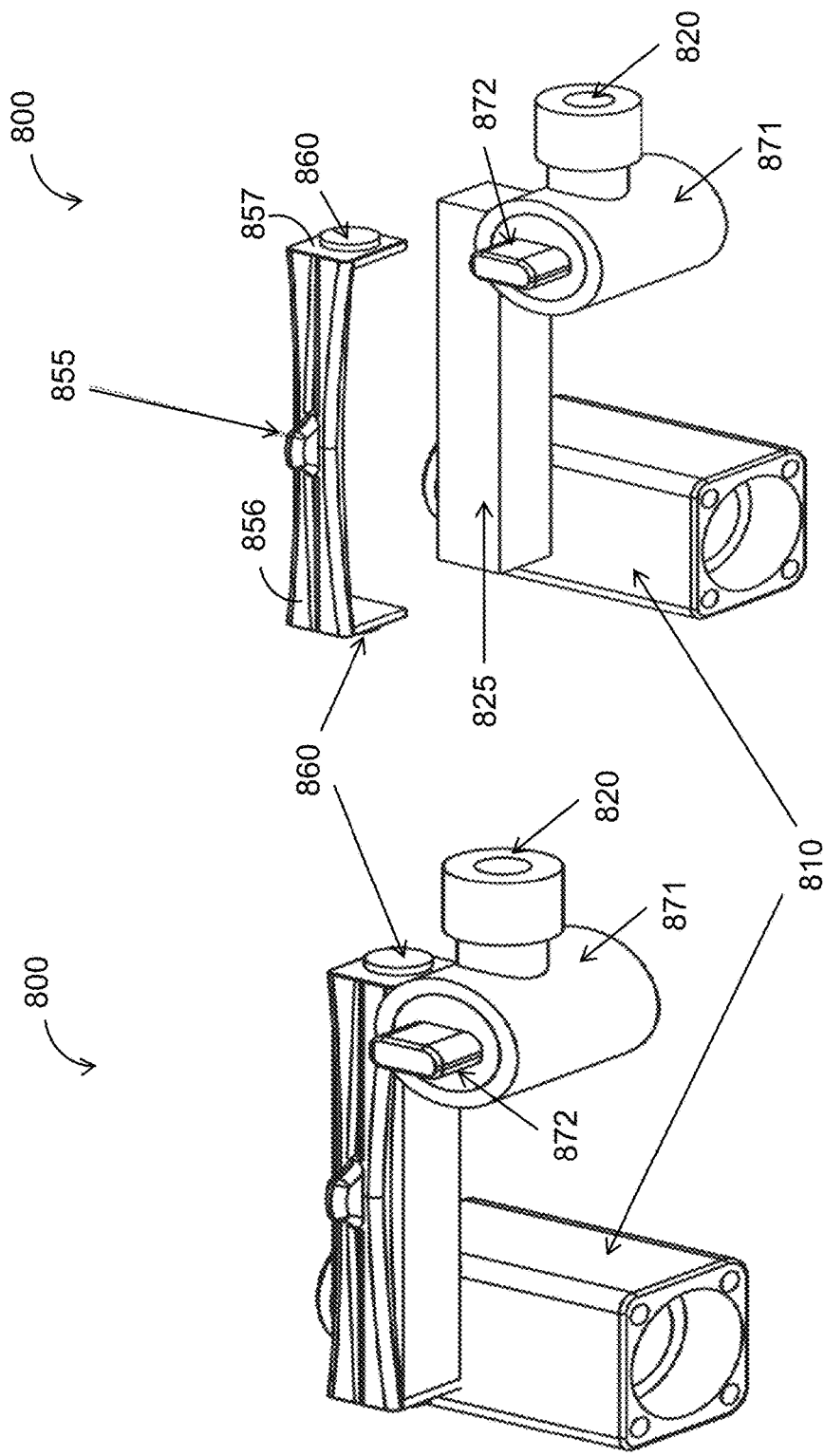
FIGS. 8A and 8B show diagrams illustrating a second crossover segment of a manifold similar to that shown in FIGS. 5A-5D and 6.

FIGS. 8A and 8B show diagrams illustrating a second crossover segment 800 for use in a manifold 500 similar to that shown in FIGS. 5A-5D and 6. The crossover segment 800 includes a hallow component 810 representing a portion of an inlet lumen in the respective assembled manifold, an outlet port 820 and an output branch 825 coupling the hallow component 810 to the outlet port 820. In some implementations, the outlet port 820 can be coupled to the output branch 825 through a cylindrical structure 871 arranged for housing a shutoff valve 872. The shutoff valve 872 can be a manual valve (such as a ¼ turn valve or an electromechanical shutoff valve that is controllable by a control circuit or a controller.

A transducer assembly including a transducer block (or transducer saddle) 855 and a pair of transducers 860 can be mounted to the output branch 825. The transducer block 855 can include a panel (or slab) and two end-components 857 arranged transversely at both ends of the panel 856. The panel 856 can be arranged substantially parallel to (or to sit on) a longitudinal side of the output branch 825 while the end-components 857 grab onto transverse sides of the output branch 825. The transducers 860 can be positioned at the outer surfaces of the end-components 857. As such, when the transducer block 855 is mounted on the output branch 825, the transducers 860 are arranged on opposite sides of the output branch 825, therefore, allowing for ultrasonic signals to propagate directly between the two transducers without necessarily reflecting from the inner wall of the output branch 825. The transducer block 855 can be made of a polymer, copper, or other material.

FIGS. 9A and 9B show diagrams illustrating other configurations of manifold output branches. FIG. 9A shows an output branch (or output lumen) 925a forming a "V" shape. The transducers 960 can be arranged across one of the segments (of the output branch 925a) forming the "V" shape. FIG. 9B shows another output branch (or output lumen) 925b forming a "U" shape. The transducers 960 can be arranged across one of the segments (of the output branch 925b) forming the "U" shape (such as the horizontal segment). In some implementations, the output branch configurations can be employed in any of the manifolds described in this disclosure (such as manifolds 100a, 100b, 300, 400 or 500).

While the manifolds 300, 400 or 500 are described as including ultrasonic flow sensors, any other type of flow sensors can be employed instead of (or in combination with) the ultrasonic sensors. In some implementations, different types of flow sensors can be employed (or mounted) at distinct output lumens. Each of the manifolds described in this disclosure can include (or be coupled to) one or more processors configured to process or monitor data collected by the flow sensors (and/or other sensors), control any electronic or electromechanical devices associated with the manifold (such as automatic shutoff valves), communicate with external devices (such as computer servers, online servers, mobile devices, tablets, laptops, desktops, etc.), or a combination thereof. For instance, the processor can be configured to estimate fluid flow rate (or fluid flow velocity) based on signals measured by the transducers. The manifold can also include at least one memory to store computer code instructions executable by the processor(s), data collected by the flow sensors or other sensors, or other data. The manifold can also include a wireless (or other communication) interface (e.g., a Zigbee, Bluetooth, or Wi-fi interface) for communicating with an external device. For instance, the communication interface can be configured to transmit data collected by the flow sensors or other sensors e.g., water temperature sensors, pressure sensors, water quality sensors) to an external electronic device (such as a server, Internet server, cloud server, mobile device, tablet, laptop, personal computer, etc.) through a network connection (e.g., Ethernet, dial-up), or a radio link (WiFi, cellular, Zigbee).

The processor(s) can be configured to interface with a server via the communication interface (such as wireless interface), and the server may provide a dashboard (via a smart phone or other networked device) that indicates fluid usage such as water usage) statistics based on flow rate data collected by the flow sensors. Flow rate data and water usage statistics can be used to reduce water consumption through analysis of usage patterns, elimination of waste, leak detection, and incentives for lowered water use. The processor(s) can obtain data, such flow rate or flow velocity data, based on signals received from the flow sensors and either stores the data in local memory, transmits the data to a remote memory or server, or both. In some embodiments, the processor(s) can transmit the data to a server via a wireless interface (e.g., a Zigbee, Bluetooth, or Wi-fi interface). The sensors, processor(s), memory, and/or wireless interface can be powered by a battery, a power line, or, for manifolds installed outdoors, a solar cell. The flow sensors may also have a passive wake-up feature for power reduction; that is, they may only draw power when water flows through the manifold or a respective outlet port. The manifold may also include a turbine or other device that harvests energy from flowing water to obviate need for battery or wall power.

Upon receiving the data from the processor, the server can store the data in a water usage database. Engines (possibly embodied as computer-readable instructions on a nonvolatile storage medium) can compute water usage statistics and present these water usage statistics to homeowners, renters, building owners, property managers, utilities managers, and other users via management dashboards. In some implementations, the water usage statistics can be computed by the processor(s) embedded in (or coupled to) the manifold. The dashboards can be displayed via web browsers or special-purpose applications on computer monitors, smart phones (e.g., iPhones, Blackberries, and Droids), laptop computers (including iPads), or any other suitable display. In some implementations, the manifold sensors can be combined with other meters and sensors to form a distributed sensor network that can be used to meter individual units in an apartment complex, individual businesses in a shopping mall, or individual homes and businesses in a utility service area. Data collected from such a distributed sensor network provides information on aggregate water usage, individual water usage, and statistics and patterns related to water usage in a given building or water usage zone.

In some implementations, the flow sensors can be configured to calibrate themselves using readings from the main water meter, branch water meters (including meters within the same building), inline leak detectors, and/or data from the water usage database. Self calibration can allow for accurate flow measurement and leak detection.

In some implementations, the dashboards can provide real-time comparisons/rankings within and among social networks, neighborhoods, cities, counties, states, and nation-wide using water usage statistics derived from flow rate sensor data. Data can also be used (for instance by a computer application) to calculate and compare water footprints, to visualize water usage data, to compute variance in water usage for a given fixture or building, and to reward consumers for low consumption and/or for reducing consumption. The server and/or manifold itself can also be configured to store data indicative of money amounts the consumer anticipates will be used each month and notify the consumer of amount used for budgeting. Amounts may be carried over to the next month, just as minutes are carried over in prepaid cell phones. The amount can be loaded by consumer using a dashboard, cell phone, smart phone, or other device capable of interfacing with the manifold sensor. Prepaid amounts can be deposited with the water company or property owner and used for payment of consumer usage. For instance, a user can set or budget water flow rates and volumes for specific ports. For example, port serving irrigations systems can be set for optimum rates and volume for plant types or turf types and shall turn off if a flow rate or volume is exceeded that may be cause by a broken sprinkler head that allows massive flow at the break. Also, a user can limit water or meter water to a rented room or apartment or home.

The flow-sensing manifolds and dashboards described in this disclosure can enable water credits trading similar to the cap and trade system proposed for carbon emissions. Water pricing is based on a tier usage system. If consumers are aware of their consumption and know what they have yet to consume in a lower tier, they may elect to trade or sell the water they have yet to use in the lower tier to a person or business that is nearing a higher tier rate for that month. Immediate awareness of usage and remaining amounts give consumers the ability to trade/sell their remaining lower tier usage rates to higher consumers at the lower tier rates. It also gives consumers the ability to receive an addition reward from the sale of what they conserve to higher users. Higher users have the ability to purchase unused capacity at lower rates compared to the higher tier rates charged by the utility company. Knowledge of usage should promote conservation and result in greater rewards for those who conserve. Public utilities, property owners, and property managers may benefit as well due to overall lower consumption. A public exchange could be established in the city or private exchanges could be developed for multi-tenant buildings, such as apartment buildings and shopping malls, where tenants of the same building trade water credits.

The dashboards can provide advice to consumers about how to lower water consumption (or fluid consumption, in general) and alerts relating to the condition of the plumbing. For instance, the dashboards can provide instructions to reduce consumption by changing dishwasher or other appliance settings. The dashboards can also recognize and alert users about changes in flow due to leaks, frozen pipes, flooding, malfunctioning appliances, and other maintenance conditions. Manifolds with flow rate sensors integrated thereon can also be used to detect unauthorized water usage, e.g., in vacant apartments. The dashboard may also predict potentially damaging situations, such as freezing temperatures, by combining water usage data with data derived from other sources or other sensors (such as temperature sensors integrated in the manifold). In some implementations the processor(s) can transmit alerts via the wireless interface to the fire department, emergency services, property owner, utility company, and/or insurance company based on, for instance, measured flow rate and other sensor data indicating fire, flooding, or another disruption in service.

The dashboards can also provide advertisements and/or links to websites that can provide fluid distribution system maintenance or repair services. In some implementations, targeted advertisements for water appliances or plumbing fixtures can be generated based on data collected about individual fixture usage over time and overall water consumption. The choice of which advertisements to include for these services and products can be made based on an advertising service that maintenance service providers subscribe to. The frequency of relevant advertisement occurrence could be based on level of subscription, i.e., higher subscription rate for a particular subscriber results in a more frequent occurrence of that subscribers advertisements on the dashboard.

In some implementations, manifolds described herein can be employed for automatically monitoring fluid flow and/or fluid usage by different apparatuses (such as fixtures and/or appliances) associated with (or coupled to) a fluid distribution system (such as a water distribution system). Fluid flow detected by the manifolds can be classified based on different fluid flow events (such as water flow events). While examples described in this disclosure relate to water distribution systems, the devices (such as manifolds) and flow monitoring methods (such as detection and estimation of fixture/appliance fluid usage methods) described in this disclosure can be employed with regard to other fluid distribution systems (e.g., a natural gas distribution system).

Figure 10A:
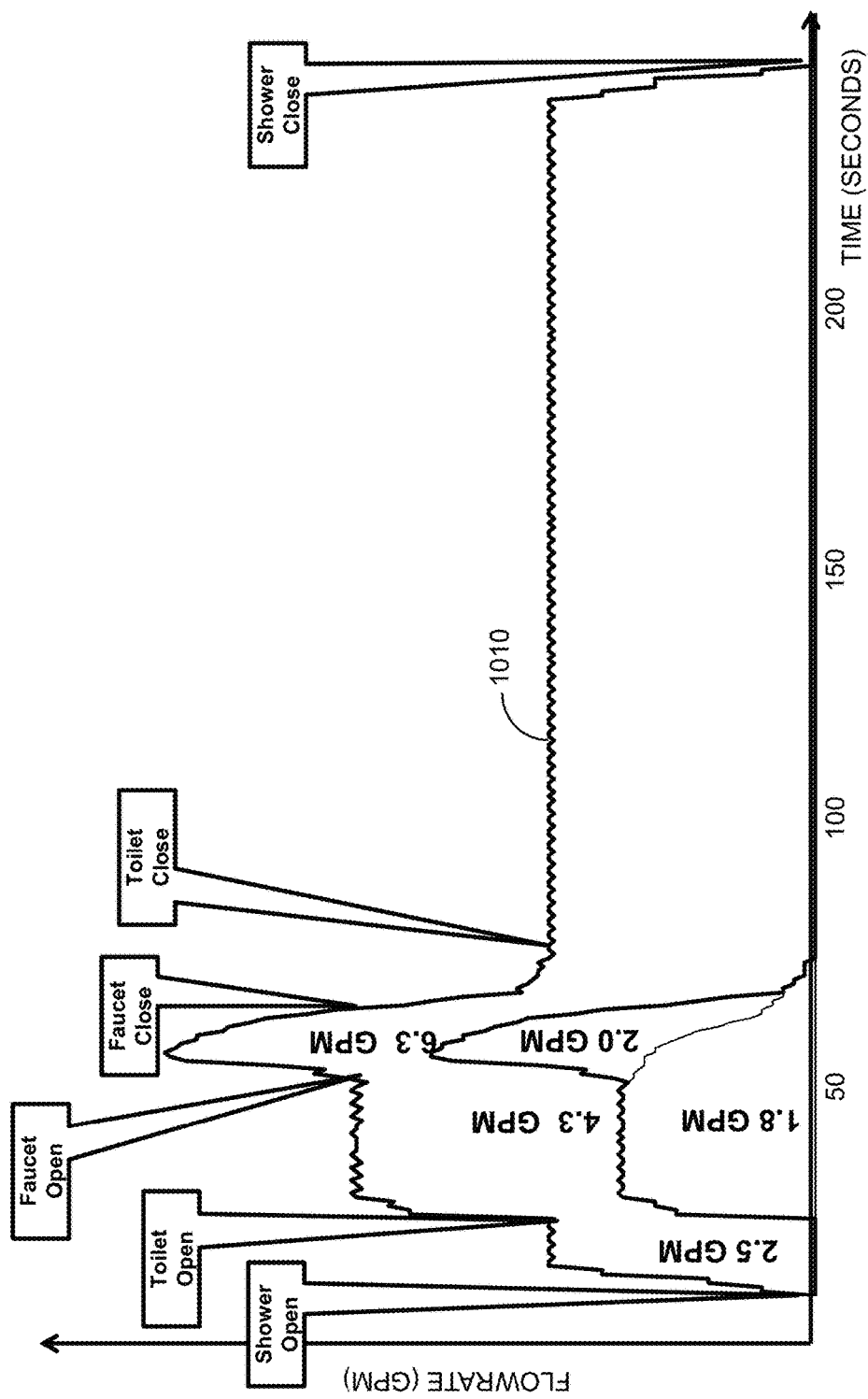
FIG. 10A shows a plot depicting an example water flow rate over time associated with time overlapping water flow events.

FIG. 10A shows a plot depicting an example water flow rate 1010 over time associated with time overlapping water flow events. The water flow events shown in FIG. 10A include "shower open," "toilet open," "faucet open," "faucet close," "toilet close," and "shower close." In general, the "open" events indicate start of water flow driven by a fixture or appliance such as toilet flush, shower, faucet, washing machine, dishwasher, etc. The "close" events indicate end of water flow driven by the fixture or appliance. From the plot in FIG. 10A one can see that "open" and "close" are associated with (e.g., preceded or followed by) sharp variation in the detected water flow rate. At any given point in time, the water flow rate 1010 (for example detected at an outlet port of a manifold) represents the cumulative water flow rate for the fixtures and/or appliances driving water flow (through the outlet port) at that point of time.

Figure 10B:
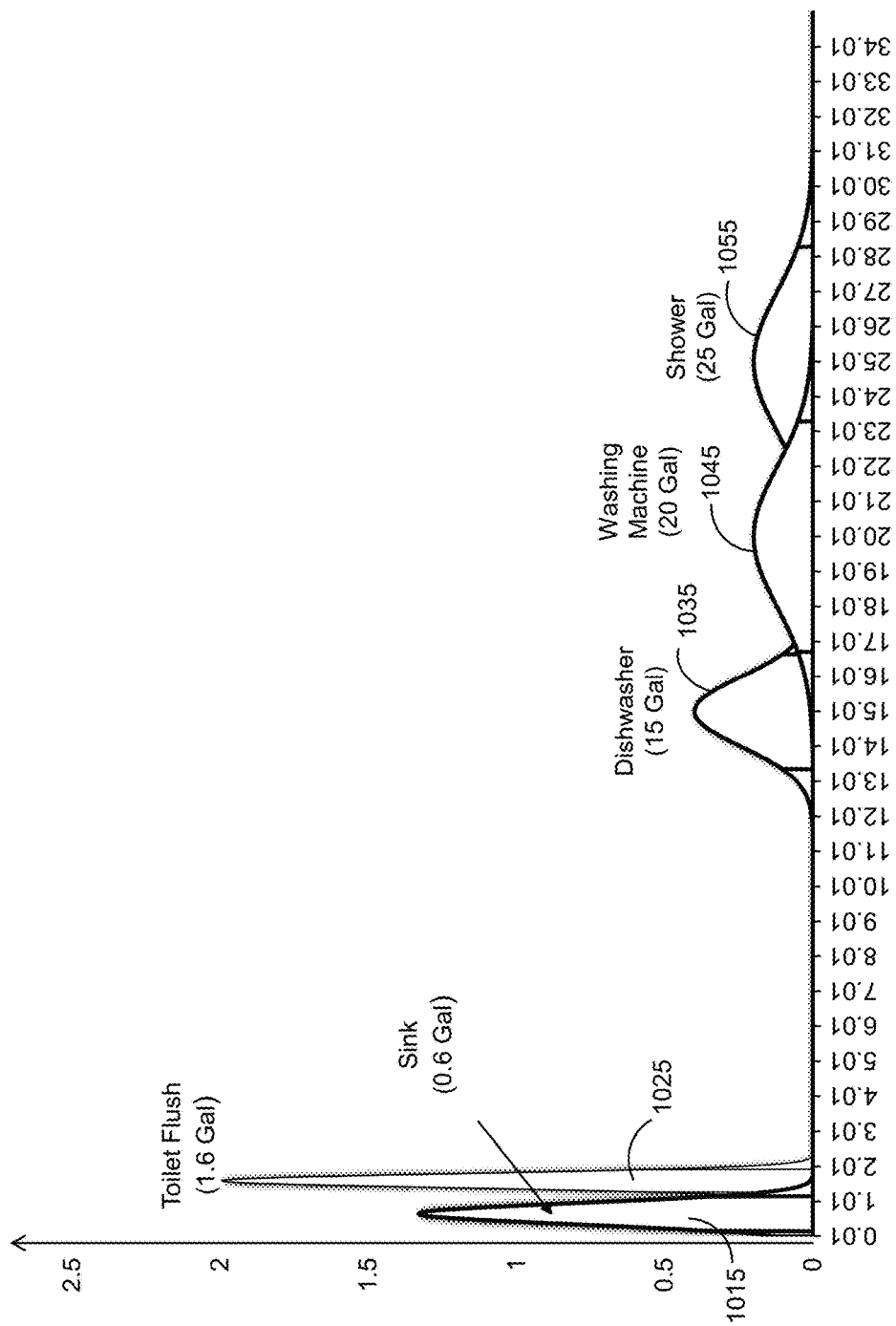
FIG. 10B shows multiple plots of probability distributions (e.g., probability density functions) of total water usage per appliance/fixture event.

FIG. 10B shows multiple plots of probability distributions (e.g., probability density functions) for water usage per appliance/fixture event. The probability density function 1015 illustrates the probability distribution of the water amount used during a single water flow event driven solely by a sink. The probability density function 1025 illustrates the probability distribution of the water amount used during a single water flow event driven solely by a toilet flush. The probability density functions 1035, 1045, and 1055 illustrate the probability distribution of the water amount used during a single water flow event driven solely by a dishwasher, a washing machine, and a shower, respectively. The probability distributions shown in FIG. 10B exhibit a Gaussian (for Gaussian-like) behavior.

In some implementations, a processor (such as a processor associated with a manifold, flow meter or computer device) can employ measured water flow rate (or fluid flow rate, in general) and information indicative of the probability distributions of water usage per apparatus (such as appliance or fixture) event to determine which apparatuses contributed to the measured fluid flow and/or the fluid amount used by each apparatus. For instance, the processor can estimate the cumulative fluid amount passing through an outlet port or a lumen during a time interval based on multiple measurements of the fluid flow rate at the outlet port or the lumen. Using the estimated cumulative fluid amount and the probability distributions of water usage per apparatus such as appliance or fixture) event, the processor can desegregate the contribution of each apparatus to the estimated cumulative fluid amount.

Considering the probability distributions shown in FIG. 10B, the mean values for water usage per apparatus event are 0.66 gallon G, 1.6 G, 15.0 G, 20.0 G, and 25.0 G for the sink, the toilet flush, the dish washer, the washing machine, and the shower, respectively. Using such means, the processor can estimate a cumulative water flow usage amount driven by a combination of these apparatuses as $CU=S\times 0.66+T\times 1.6+D\times 15.0+W\times 20.0+B\times 25.0$, where S, T, D, W, and B represent the number of sink, toilet, dish washer, washing machine, and shower events, respectively, that could contribute to driving water flow during a given time interval. In some implementations, the processor can use such mathematical representation (of the cumulative water flow usage amount) to detect which fixtures and/or appliances contributed to driving a measured water flow usage amount within a given time interval.

Using the computed amount of used water for a given event and the means of the probability density functions shown in FIG. 10B, the processor can determine the combination of fixtures and/or appliances that likely contributed to driving water during the recorded event. For instance, the processor can evaluate various values of cumulative water usage CU using different possible combinations of fixtures and/or appliances. The processor can then compare the evaluated CU values to the computed amount of water used (or consumed) during the event. A combination of fixtures and/or appliances with a respective CU that is close to the computed total amount of water used during the event is likely to be the combination driving water flow during the recorded event.

Figure 11A:
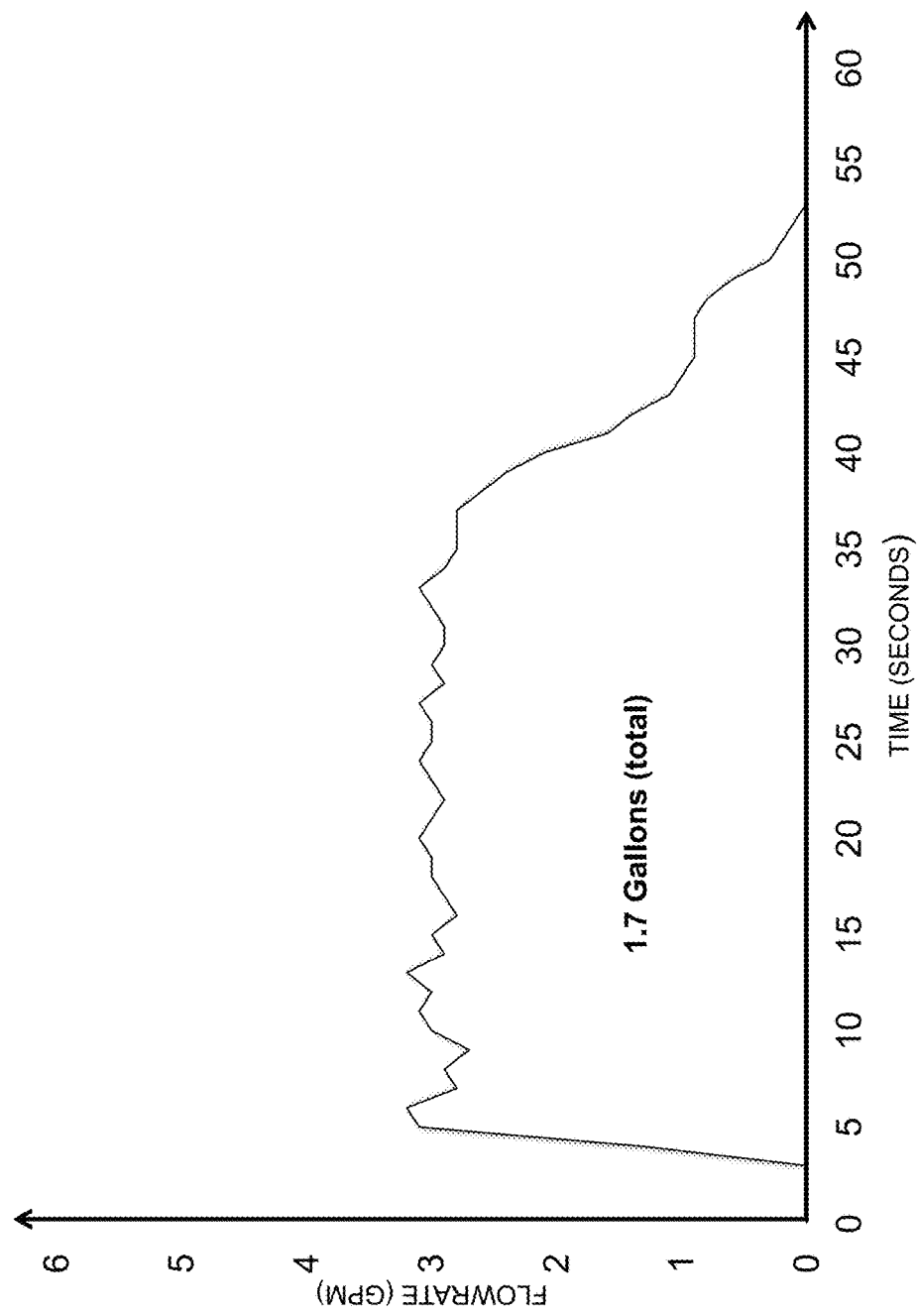
FIGS. 11A-11C show plots illustrating water flow rates recorded for various water flow events driven by fixtures and/or appliances associated with FIG. 10B.
Figure 11B:
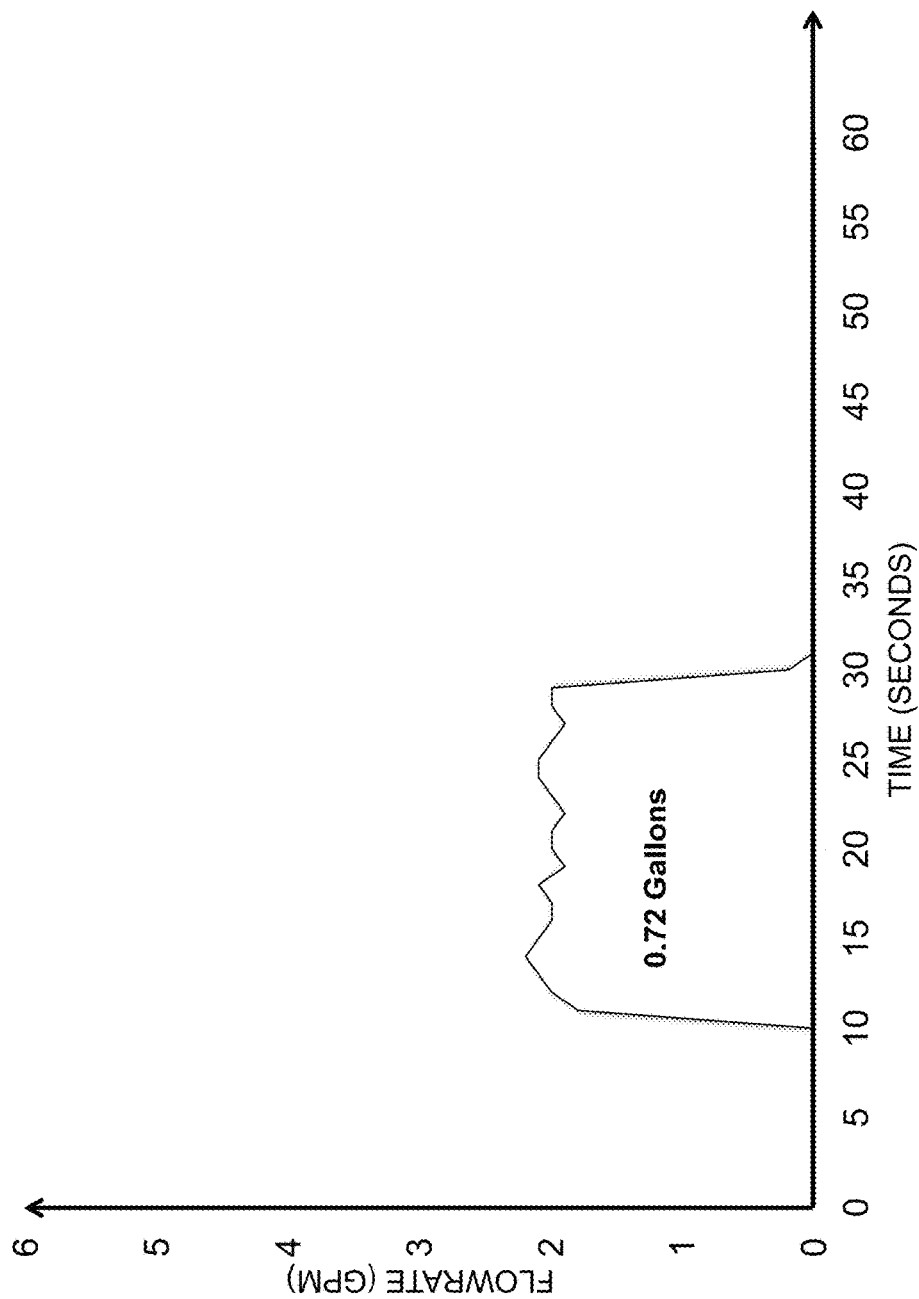
Figure 11C:
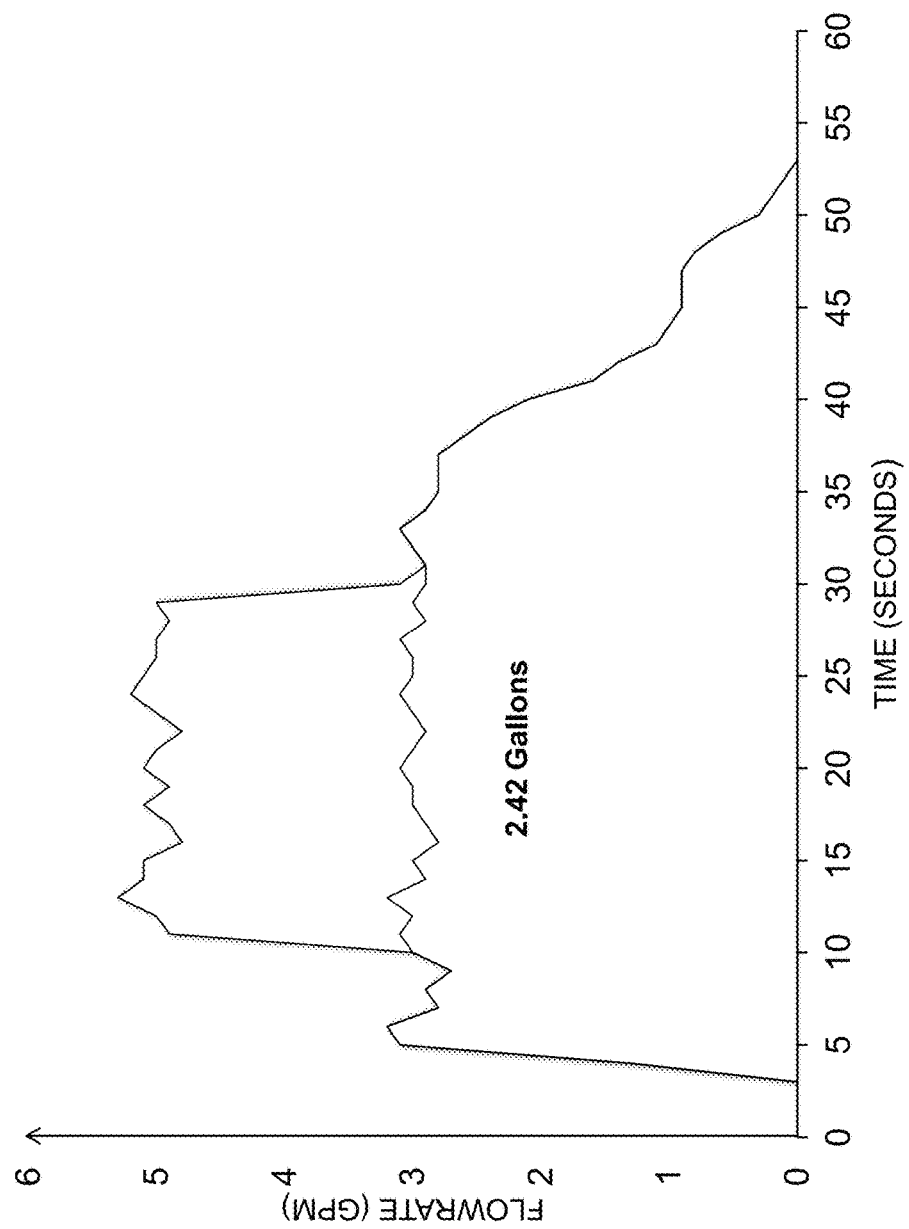

FIGS. 11A-11C show plots illustrating water flow rates recorded for various water flow events driven by fixtures and/or appliances associated with FIG. 10B. That is, the water flow events shown in FIGS. 11A-11C are driven by a combination of apparatuses (among those shown in FIG. 10B) with respective probability distributions of water usage per appliance/fixture event as shown in FIG. 10B. For each of the water events shown in FIGS. 11A-11C, the processor can compute (or estimate) the total amount of water used in each event based on respective flow rate measurements. For instance, the processor can integrate the plot representing measured flow rate for each event to compute the respective total amount of fluid used. The processor can employ any numerical integration method such as trapezoidal rule based integration, Riemann sums, or any other numerical integration method known in the field of mathematics. When computing the total amount of water used in a given event, the integration is applied to a complete event (e.g., a recorded flow rate plot, or a sequence of flow rate measurements, that starts and ends with a flow rate substantially equal to zero GPM). That is, the area considered for integration is an area defined by a plot starting and ending at the x-axis.

Considering the water flow event shown in FIG. 11A, the total amount of water used during that event can be computed (e.g., by the processor) to be equal to 1.7 gallons. The processor can evaluate the mathematical expression $CU=S\times 0.66+T\times 1.6+D\times 15.0+W\times 20.0+B\times 25.0$ with different integer values for S, T, D, W and B. For instance, for [S T D W B]=[1 0 0 0 0], CU=0.66, for [S T D W B]=[2 0 0 0 0], CU=1.32 and for [S T D W B]=[0 1 0 0 0], CU=1.6. The processor can then compare the evaluated CU values to 1.7 G (the total amount of water used during the event), for instance, by computing respective percentage mean squared errors (MSE). The computed percentage errors are 5% error for [S T D W B]=[0 1 0 0 0], 22% error for [S T D W B]=[2 0 0 0 0], and 5% error for [S T D W B]=[0 1 0 0 0]. The processor can select the combination with the smallest error as the one that drove the water flow during the recorded water flow event. In the above example, only three combinations were considered as other combinations would obviously result in much larger errors. In some implementations, the processor can employ measures of errors such as mean squared error (MSE), L1 norm error, or other measures of error to compare evaluated CU values with the computed total amount of water used. The combination with the least MSE can be selected as representative of the combination of fixtures and/or appliances driving the recorded water flow event. In the example shown in FIG. 11A the weight vector representative of a single toilet flush results in the least MSE.

For the water flow event shown, in FIG. 11B, the total amount of water used is 0.72. The percentage errors for [S T D W B]=[0 1 0 0 0], [S T D W B]=[2 0 0 0 0], and [S T D W B]=[0 1 0 0 0] are 8%, 83% and 122%, respectively. In this example, only three combinations were considered as other combinations would obviously result in much larger errors. Errors for other combinations that are not evaluated are obviously larger than those shown in this example. Based on these error values, the processor can select the combination with a single sink as the one that drove the water flow during the recorded water flow event.

Considering the water flow event shown in FIG. 11C, the total amount of water used is 2.42 gallons. The percentage errors for [S T D W B]=[3 0 0 0 0], [S T D W B]=[0 1 0 0 0], and [S T D W B]=[1 1 0 0 0] are 18%, 83% and 6%, respectively. Based on these error values, the processor can select the combination with a single sink as the one that drove the water flow during the recorded water flow event. In this example, errors for only three combinations are shown for the sake of brevity. Other combinations would obviously result in larger errors.

When evaluating the cumulative water usage CU and respective errors for different combinations of fixtures and/or appliances, the processor can determine the number of combinations to consider based on, for example, the computed total amount of water used based on the flow rate measurements, the time duration of the recorded water flow event, the total number of a given fixture or appliance coupled to the water distribution system (e.g., the total number of sinks in an apartment). For instance, in the water flow event shown FIG. 11B, given that the total amount of water used during that event is 0.72 gallons, the processor can avoid evaluating combinations involving a dish washer, washing machine or shower as water events driven by these fixtures/appliances are associated with water usage values that are much greater than the total amount of water associated with the recorded event.

Figure 12:
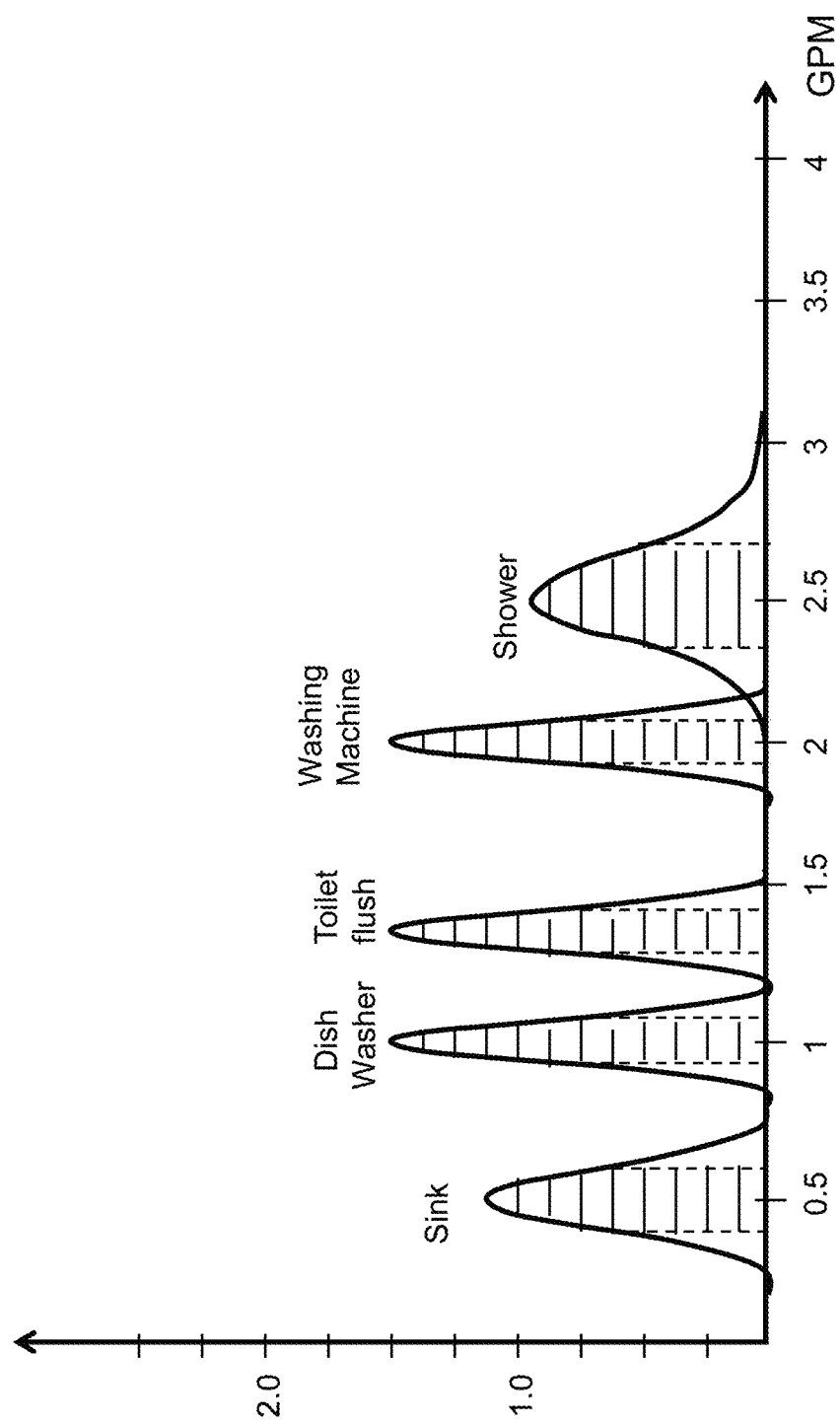
FIG. 12 shows multiple plots of water flow rate probability distributions (e.g., probability density functions) associated with various fixtures and appliances.

FIG. 12 shows multiple plots of water flow rate probability distributions (e.g., probability density functions) associated with various fixtures and appliances. That is, for each appliance or fixture, the respective probability density function represents the probability distribution of the water flow rate (at any given point of time) for that appliance or fixture. In general, a cumulative water flow rate (such as the water flow rate 1010 shown in FIG. 10A) can be viewed at any given point of time as a weighted sum of individual water flow rates of fixtures and/or appliances that are driving water flow at that point of time through a given port. For instance, given that the means of the flow rates for the sink, the dish washer, the toilet flush, the washing machine and the shower are 0.5 GPM, 1.0 GPM, 1.3, GPM, 2.0 GPM and 2.5 GPM, respectively, a cumulative flow rate driven by a combination of these fixtures and appliances, at a given time instance, can be represented as CR=S×0.5+D×1.0+T×1.3+W×2.0+B×2.5, where S, D, T, W, and B represent the number of sinks, dish washers, toilet flushes, washing machines, and showers that are simultaneously driving water at that time instance.

In some implementations, given a flow rate measurement, the processor can employ the mathematical formulation for the cumulative flow rate CR to determine the most likely combination of apparatuses (e.g., fixtures and appliances) that are driving the water flow at the time instance the flow rate was measured. For instance, similar to the examples discussed with respect to FIGS. 11A-11C, the processor can compare the CR values evaluated for various combinations of fixtures and/or appliances with the measured flow rate value(s) by computing and comparing respective errors. The processor can select the combination of fixtures and/or appliances resulting in the least error as the one likely to have driven the water flow at the time the flow rate is measured.

In general, the problem of identifying which device(s) are driving fluid flow (also referred to as device identification/fingerprinting problem) during a recorded fluid flow event, or at the time a flow rate value is measured, is a detection problem for detecting a vector state (or a plurality of ON or OFF states) for a plurality of devices based on observation data. The observation data can include total flow measurements (as discussed with respect to FIGS. 10B and 11A-11C) or flow rate measurements (as described with respect to FIG. 13). In some implementations, other fluid flow event features such as event time duration, manifold outlet port associated with each measured flow data value and/or other features can be used in addition to measured flow data to determine a combination of devices that were active at the time flow data was measured. A home or building monitoring system could consist of one or more water flow sensors (meters) and any number or type of other external sensors that all communicate to a centralized or distributed fingerprinting/identification application. The measured data can include, but is not limited to (1) water flow usage data, (2) water flow rate data, (3) data from other sensors in a home or building, (4) and/or information indicative of flow sensors associated with each respective measured flow data set measurement.

In general, flow sensors can measure different flow parameters, such as duration of flow events, peak water flow rate during a particular time interval, average flow rate during a particular time interval, instantaneous flow rate during a time interval, slope of accumulation during a particular time interval, instantaneous flow rate slope during a particular time interval, interval between active flow events, shape of flow rate versus time, both onset and release events, the like, or combinations thereof.

The flow monitoring system may also collect data from other sensors such as, door sensor(s) throughout a home indicating open/close, infrared sensor(s), light sensor(s), acoustic sensors placed throughout a home/building, accelerometers placed in pipes/handles of appliances, humidity sensors, ambient air temperature sensors (e.g., bath indoor and outdoor placement), water activated switches (water between two electrodes), toilet seat sensors, and/or other sensors. The monitoring system can also record other information such as season/month of the year, day of the week, time of the day, geographic location, gender/age/number of occupants in home or building, health conditions of home occupants, current weather conditions from, occupation state of the home or building, and/or other side information.

In some implementations, using training data with information indicative of active plumbing fixtures and water-using appliances when a particular set of measured data is observed, a processor (e.g., associated with a computer device) can generate (or estimate) a statistical model for use in detecting (or identifying) active devices based on measured data. The computer device (such as a server) can employ statistical techniques such as histograms, kernel density estimation, Gaussian mixture models (GMMs), hidden Markov models (HMMs), factorial HMMs, or other statistical modeling methods. Specifically, let Y be a vector of any combination of measured data (such as fluid flow measurements, other sensor(s) data and/or other data as described above) and let X be a device-events vector indicative of active devices, or a number thereof, in a monitored fluid distribution system (such as a water distribution system of a building or an apartment). Generating the statistical model can include estimating the probabilities $p(Y|X)$ and/or $p(X|Y)$ for various instances of X and Y. For instance, generating the statistical model can include estimating the probability density function (pdf) (or probability mass function (pmf)) of the conditional random variable $Y|X$. In some implementations, the statistical model can be a classifier that allows mapping each observation vector Y to a respective device-events vector X. In some implementations, such classified can be configured to provide a respective probability value $p(X|Y)$ when mapping an instance of the observation random vector Y to the device-events vector X.

The vector X can be a vector of (1) binary random variables (each takes a value of 0 or 1) representing the states (such as active or inactive) of each or a subset of the fluid-using devices coupled to fluid distribution system (such as a water distribution system in a home or building), (2) integer random variable(s) representing the number of events per device or the number of active devices, or (3) a combination of both device states and number of active devices. The observation random vector Y can include measured flow rate values (as discussed with regard to FIG. 13) from one or more flow sensors (e.g., at a time instance or over a time interval), measured flow velocity values (e.g., at a time instance or over a time interval), measured total fluid usage per event (as discussed with respect to FIGS. 10B and 11A-11C), flow event time duration, or a combination thereof. The observation random vector Y can also include measured fluid pressure values, measured temperature values, other sensor data, other information (such as information indicative of device(s) served by each manifold outlet port and corresponding flow sensor) or a combination thereof.

If the p(Y|X) are known (e.g., estimated as part of the statistical model) for each possible instance of X, then a processor can employ maximum likelihood (ML) estimation to determine which water events X occurred given that Y is observed (or measured). The ML estimation process (or application can be executed by a processor associated with a manifold, flow meter, a smartphone, tablet computer, or server. The ML estimation application can obtain the observation instance of Y from a flow meter (such as ultrasonic sensor) and map the observation instance of Y to an instance of X that maximizes the probability p(Y|X). That is $X_{ML}=\mathrm{argmax}_X p(Y|X)$. In the case where the probability p(X) for each X is known pdf or pmf of X is known or estimated as part of the statistical model), then the processor can employ a maximum a posteriori probability (MAP) estimation. When employing MAP estimation, the processor is configured to select the instance of X that maximizes p(Y|X) p(X). That is $X_{MAP}=\mathrm{argmax}_X p(Y|X) p(X)$. When generating (or estimating) a Gaussian mixture model (GMM), the processor can employ training data to model the conditional random vectors X|Y using Gaussian mixtures (for Gaussian clusters) and estimate respective Gaussian probability distributions. Each Gaussian mixture or cluster can be a associated with a respective instance of the vector X. Given an observation instance y of the random vector Y, the processor can select the instance of X associated with the cluster leading to the highest p(y|X).

In some implementations, the processor can model states of the devices, that can drive fluid flow through one or more outlet ports or lumens using one or more hidden Markov chains. For instance, the processor can represent any sequence of flow events over time using a single hidden Markov chain such that each state in the chain corresponds to a respective instance of the vector X at a respective time instance $t\pm k\times\Delta t$, where k is an integer value, t is a reference time instance and $\Delta t$ is a time period (e.g., representing flow data measurement period). Each state of hidden Markov chain has an output corresponding to possible observation data. In modeling the HMM, the processor can be configured to estimate the probability distributions for the HMM state outputs. Such probability distributions represent the conditional probabilities p(y|X). The processor can also estimate transition probabilities between different states or use predefined values for such transition probabilities.

Figure 13:
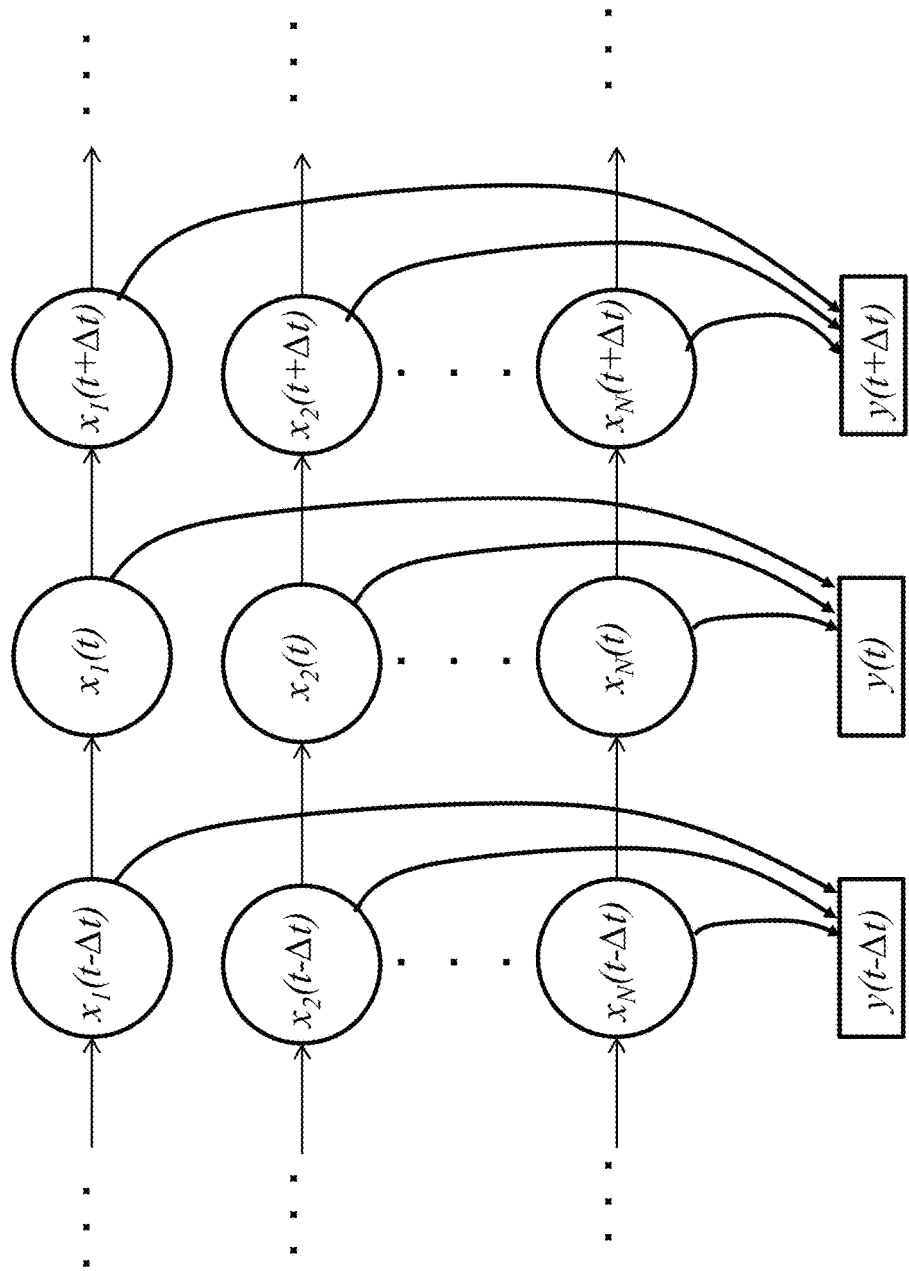
FIG. 13 shows a flow diagram illustrating a factorial hidden Markov model (FHMM).

FIG. 13 shows a flow diagram illustrating a factorial hidden Markov model (FHMM). In some implementations, the processor can model states of the devices, that can drive fluid flow through one or more outlet ports or lumens using a FHMM. In a FHMM, the states of each device over time are represented using a respective separate hidden Markov chain. As shown in FIG. 13, given that the total number of devices that drive fluid flow in a monitored system is N, the corresponding FHMM includes N hidden Markov chains running in parallel. Each hidden Markov chain corresponds to a respective device. At any given time instance $t\pm k\times\Delta t$, the observation data (e.g., an instance of the vector or elements thereof) corresponds to one or more cumulative sums of outputs from distinct states in the N hidden Markov chains. For instance, when multiple flow sensors are employed (such as in association with multiple outlet ports of a manifold), multiple cumulative sums are generated by the FHMM at a given time instance. For each flow sensor at a given outlet port, a respective cumulative sum can be generated (by the FHMM) as the sum of outputs from hidden Markov chains associated with devices served by that outlet port.

Figure 14:
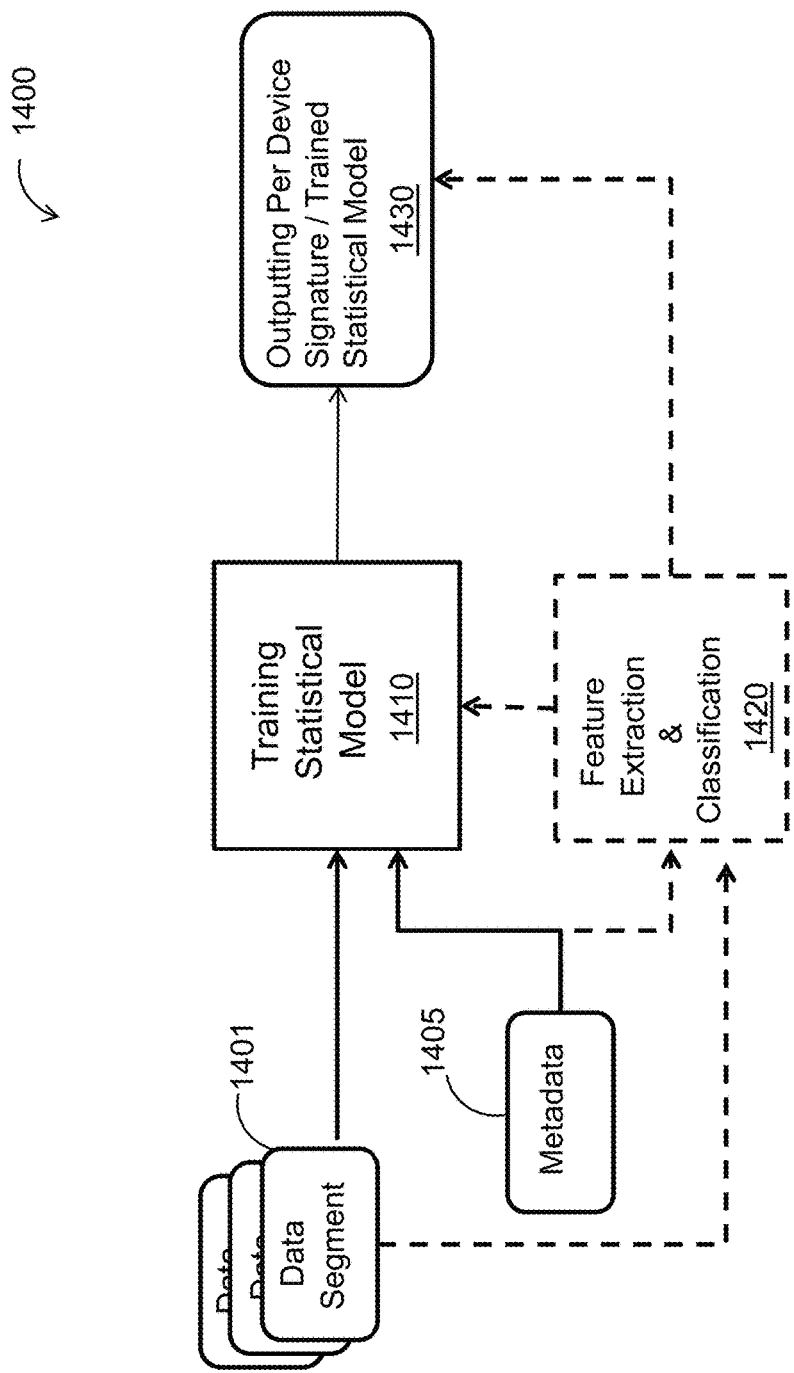
FIG. 14 shows a flow chart illustrating a process for estimating a statistical model or device signatures.

FIG. 14 shows a flow chart illustrating a process 1400 for estimating a statistical model or device signatures. The process 1400 includes obtaining training data segments 1401 and respective metadata 1405. The training data segments 1401 can include measured flow rate data segments (or measured flow velocity data segments) obtained from one or more flow sensors integrated in a fluid distribution system (such as a water distribution system). In some implementations, the flow sensor(s) can be integrated at one or more lumens (such as pipe(s) or tailpiece(s)) in a fluid distribution system. In some implementations, the flow sensors can be integrated in one or more manifolds (such as described with respect to FIGS. 1A, 1B, 3A, 3B, 4, 5A-5D, 6, 7A, 7B, 8A and 8B). The training data segments can include a plurality of measurement samples for each device type (such as a sink, shower, toilet flush, dish washer, washing machine, etc.) operated solely in active mode (i.e., driving fluid flow). Using a plurality of distinct measurement samples (e.g., associated with various flow events driven solely by the same device) for each device allows for reliable estimation of the distribution of the conditional probabilities p(Y|X).

The metadata 1405 can include user-provided data indicative of active device(s) at various time instances, data indicative of the flow sensor associated with each data segment 1401 (in case multiple flow sensors are employed) and respective devices served by the lumen where the flow sensor is located, other sensor data (such as temperature measurements, fluid pressure measurements, etc.), time information (such as time of day), etc. The user can be a directed-study pilot participant, consumer, or industrial end user. The metadata 1405 can be entered through a separate or integrated interface application running on a smartphone or tablet computer. For example, the user can first enter information about the number of plumbing fixtures and water-using appliances in a home or building. The user can also enter a subset of the side information, such as number of occupants and occupation state of the home or building. The user can then use the interface application to tag water events in real-time as they occur, including the type and estimated duration. The interface application can communicate such metadata 1405 to a training application running on a server or computer device. The data segments 1401 paired with the metadata 1405 represent the training data. In a case where multiple flow sensors are integrated at each output lumen of one or more manifolds and each output lumen is arranged to serve one respective fluid using device, information indicative of the output lumen (or the flow sensor therein) associated with each data segment 1501 can allow separating the data segments 1501 based on respective fluid using devices. The data segments 1501 and the metadata 1505 can be arranged in separate data files or combined in one or more data files.

As different flow events occur, the training application can generate a set of p(Y|X) and p(X). In some implementations, probability density functions associated with flow events involving a combination of devices being active simultaneously can be computed by convolving probability density functions associated with respective events involving a single device each. For instance, the pdf for Y|X=[1 1 0 0 0] can be obtained as the convolution for the pdf of Y|X=[1 0 0 0 0] and the pdf for Y|X=[0 1 0 0 0]. In some implementations, the training data can include data segments 1501 for all possible combinations of devices. In such implementations, the pdfs associated with events involving a combination of devices driving fluid flow simultaneously can derived directly from the training data.

The process 1400 can include training a statistical model, for instance, by estimating respective parameters (step 1410). The statistical model can include a maximum likelihood (ML) estimator, maximum a-posteriori estimator, Gaussian mixture model (GMM), hidden Markov model (HMM), factorial HMM (FHMM), or other statistical model. Using the data segments 1401 and the metadata 1405, the training application can estimate internal parameters of the statistical model (such as probability density functions for observations constrained to a given device-events vector (i.e., Y|X), probability mass functions for X, observation clustering intervals (or regions), transition probabilities e.g., for HMM and FHMM), or a combination thereof. The training application can estimate such internal parameters through iterative or one-step procedures.

The process 1400 can also include extracting other features from the training data and classifying the extracted features (step 1420). For instance, the training application can extract features such as time duration, total fluid usage, mean flow rate, number of peaks, maximum flow rate, minimum flow rate or other features associated with each flow event. The training application can then classify the extracted features, for instance, per single-device events. For example, the time duration of toilet flush flow events can be typically shorter than shower flow event or washing machine flow events. Accordingly, information indicative of event time durations can help segregate (or classify) various device flow events. The training application can employ any classification technique known in the art. In some implementations, the feature extraction and classification step can be optional.

The training application is configured to output a trained statistical model (e.g., ML estimator, MAP estimator, GMM, FHMM, etc.). The training application can also provide per device signatures such as feature classification results, observation data intervals (or regions associated with each device, or a combination thereof). The trained statistical model and/or the device signature information can be employed by a computer device or processor to estimate flow events based on recorded observation data.

Figure 15:
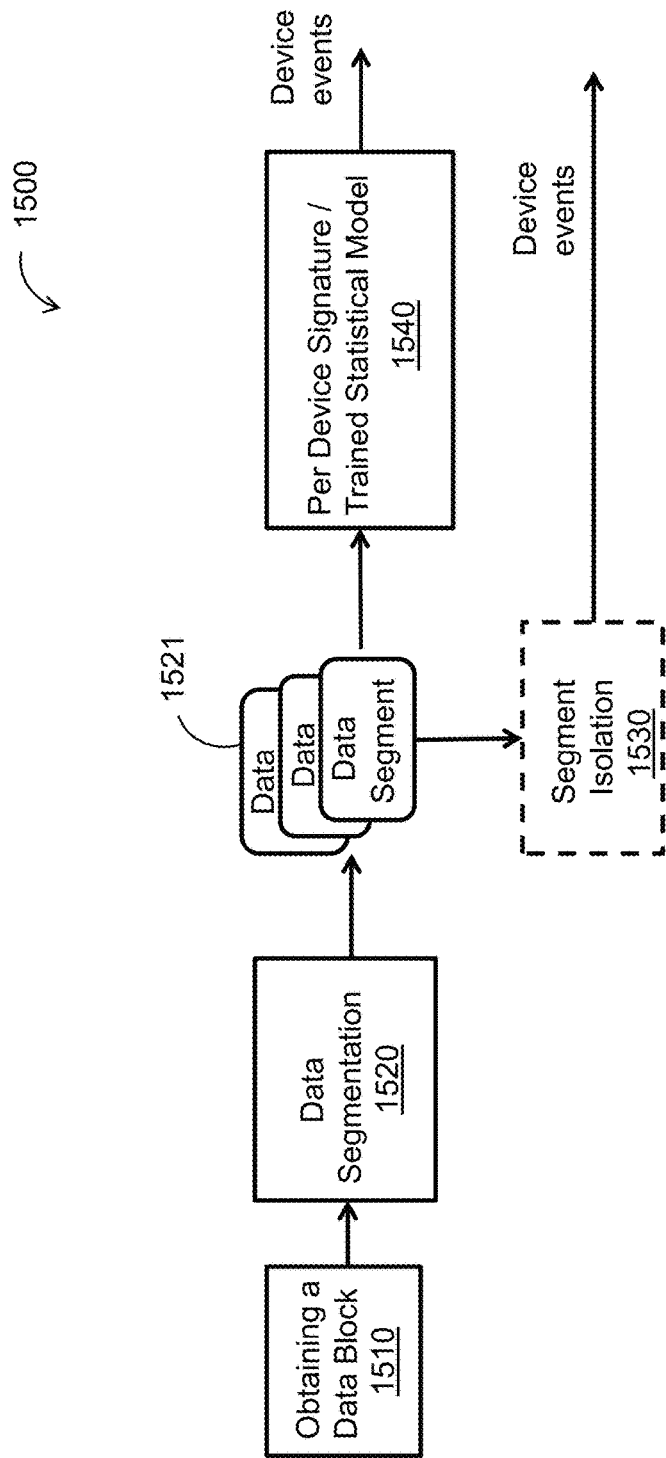
FIG. 15 shows a flow diagram illustrating a process for estimating flow events based on observation data.

FIG. 15 shows a flow diagram illustrating a process 1500 for estimating flow events based on observation data. The process 1500 can include obtaining a data block by a processor. The data block can be hours long (such as 8 hours long, 10 hours long, 12 hours long, 24 hours long or of other duration). The data block can include one or more sequences e.g., associated with distinct flow sensors) of flow sensor measurement data (such as flow rate measurements or flow velocity measurements), measurement data from other sensors (such fluid pressure measurements, temperature measurement data, etc.) and/or other data such data indicative of flow sensors or lumens/ports associated thereof).

The process 1500 can include the processor segmenting a sequence of flow sensor measurements into one or more segments (step 1520). The processor can segment a sequence of flow sensor measurement data based on, for instance, a flow rate (or flow velocity) threshold value (e.g., 0.05 GPM, 0.1 GPM, 0.2 GPM, or other flow rate value defined based on measurement error information of flow sensor(s)). That is, the processor can segment a flow sensor measurement data sequence at intervals where flow rate (flow velocity) values are below the threshold value. In some implementations, the processor can re-combine neighboring segments of the interval during which flow rate (or flow velocity) values are below the threshold is shorter than o time threshold value (for instance, if such time interval is shorter than 30 seconds, seconds or other time threshold value). In some implementations, the processor can re-join neighboring segments if, for instance, flow rate (or flow velocity) values in both segments are similar (e.g., having means and variances within a difference margin). In some implementations, the data segmentation step 1520 allows for generating data segments 1521 that represent complete flow events (e.g., with flow rate values starting and ending below the flow rate threshold). As such, a segment 1521 is likely to represent measurement data for a single-device flow event or a multi-device flow event with time overlap between fluid flows driven by more than one device. In some implementations, the processor can classify data segments 1521 associated with single-device flow events based on respective features. For instance, the processor can extract features such time duration, total fluid usage, mean flow rate, number of peaks, maximum flow rate, minimum flow rate or other features associated with each data segment. The processor can then determine whether the extracted features are indicative of a given single-device event, based for instance, on feature classification results obtained at step 1420 of FIG. 14. If the extracted features are indicate that the respective segment represents a specific single-device flow event, the processor can store the estimated single device event in a memory or database.

The process 1500 can include the processor feeding observation data in a segment 1521 to a trained statistical model (such as HMM, FHMM or GMM, ML estimator or MAP estimator) to estimate one or more respective flow events. In some implementations, the trained statistical model can be configured to generate a flow event estimate for each piece observation data associated with a respective time instant. In some implementations, the trained statistical model can be configured to generate a flow event estimate for each piece of observation data associated with a respective time interval. In some implementations, step 1540 is performed only if the processor fails to estimate the flow event based on the segment isolation step 1530. In some implementations, the segment isolation step 1530 can be optional. In such implementations, only the statistical model or device signature information can be employed to estimate recorded fluid flow events.

In some implementations, the processor can be configured to use event estimation information to estimate cumulative water usage per device. For instance, the processor can be configured to estimate total water usage by the toilet flush, the sink, the washing machine, etc.

In some implementations, the process 1500 for estimating flow events can be executed by a cloud server, a computer device or a client device (such as a tablet, mobile device or laptop, desktop). In some implementations, a simple version of the process 1500 (such as a version employing ML or MAP estimation to measured flow rate values) can be running on a processor associated with a flow meter or a manifold.

A person skilled in the art would readily appreciate that the flow event estimation methods described in this disclosure can be implemented in combination with (or independent of) manifolds described above. Also, a person skilled in the art would appreciate that the flow event estimation methods should not be limited to water distribution systems, but rather can be employed for other fluid distribution systems (such as natural gas distribution systems).

In some implementations, the processor can employ historical data to estimate the pdf for the conditional random variable Y|X. For example, distributions that describe the average flow rate of various plumbing fixtures and/or water-using appliances can be derived from water usage studies that have been conducted by the Water Research Foundation. Under the assumption that flow events associated with distinct devices are statistically independent, the probability $p(Y|x_1, \ldots x_i)$ can be computed using the convolution the pdfs of $p(x_1), \ldots p(x_1)$. This process can be repeated for each different flow events involving combinations of devices simultaneously active, resulting in a set of pdfs for Y|X that can be used in ML estimation. This technique can also be extended to multivariate distributions, e.g., historical data that includes average flow, flow duration, and peak flow.

Once an initial statistical model is created using training and/or historical data, a processor can employ such statistical model for flow event identifications. The initial identifications can be communicated back to a user training application. The user can then provide information about the correctness of these identifications, e.g., confirming/disconfirming that a toilet was flushed, the dishwasher is running, or the faucet was turned on. The confirmation information can then be communicated back to the training application. The training application can update the statistical model based on such confirmation data. For instance, the training application can update the relevant pdfs of Y|X accordingly. Bayesian learning techniques could be utilized for this update process. Online learning, such as Kalman filtering, could also be applied.

The training and event estimation/detection applications operating for a particular user can communicate with a higher-level training application that may be on a central server or distributed in a cloud computing environment. This higher-level training application could be used to generate generalized (relevant to multiple users) p(Y|X) and P(X) distributions for various fluid events. These generalized statistical models could then be used to refine the individual user statistical model. Additionally, aggregation of the measured data from multiple users that specifically includes side information about type of plumbing fixtures and water-using appliances present in a home or building can enable device-level fingerprinting. For example, statistical models that describe the average flow rate, flow duration, flow onset and release events, and peak flow characteristics of a plumbing fixture or water-using appliance can be created.

Other approaches for identifying entities driving water flow at a given point of time may employ device flow-rate templates based on training on known devices. Templates are time-domain waveform snippets of flow rates. Each template corresponds to a known device. Templates can be generated through supervised training by customer or unsupervised training by statistical clustering. Templates can then be used as basis vectors instead of using average flow rate values. Using, for example, least MSE techniques, measured aggregate signals (corresponding to simultaneous water flow events) can be decomposed into individual basis vectors corresponding to each device. For instance, wavelet decomposition can be used to represent single device flow rate signals (or templates) as weighted SUMS of wavelets. Other approaches include template matching or cross-correlation of known templates with measured flow rate. Template-based approaches yield time-varying measure of degree to which device signature is present in the measured flow rate signal.

In some implementations, the flow monitoring system includes additional sensors on drain line(s) to confirm which appliance and/or fixtures was used. Accelerometers, microphones, or other devices can be used to monitor drain lines. Knowing the difference in time between when water flow is detected at sensor, and when the drain line detects flow can be used to uniquely identify devices within a home. For example, a shower on the 2nd floor would take longer to show up at the drain than a shower on the 1st floor.

The use of drain line(s) flow information can also be used to identify fill/empty devices more accurately. A dishwasher and/or washing machine, for example, will show flow, but no drain activity during fill, then will show drain activity but no flow during pump-out. The use of drain line(s) flow information can also discriminate between indoor and outdoor water usage. High flow rates with no drain activity are either a pipe burst, or outdoor use. Flow rate can be used to discriminate.

In some implementations of the flow monitoring system, the manifold can eliminate need for handles on faucets, toilets or outlets by using information from other sensors to control manifold ports. Using a motion detector, a request for flow can be sensed at faucet location. Based on data from motion detector the manifold can turn on a manifold port to allow flow. In the case that the manifold has shutoff valves on each outlet leading to a device, the need for traditional hot and cold water handles for appliances such as faucets, showers, and toilets may be overcome. Instead of handles, wired or wireless sensors such as motion detectors, touch sensors, etc. can trigger the smart manifold to turn on and off individual appliances. For example, a shower may turn on automatically when you enter it and turn off automatically when you leave it. A toilet could flush by waving your hand over a sensor located on the toilet and the sink could turn on simultaneously.

According to some implementations, the manifold may be trained to preset the temperatures and flow rates of preference for each appliance through an application on a smart phone, tablet, or computer. A user can, for example, slide a bar or other input widget on a temperature gauge in the application while simultaneously feeling the temperature of the appliance under training until the desired temperature and flow rate is met. The manifold can then store desired temperature and flow information in memory to be recalled when activating device. The application can also allow for rules to be set when linking sensor events to appliance water control.

Appliances with handles may be retrofitted to allow such functionality. The user may use the hot and cold faucet handles to set the desired temperature and flow rate and notify the manifold through the application. The manifold can save the current flow rate for the corresponding hot and cold outlets. When the user is finished with the training, he/she would leave the appliance handles in the full open position and the manifold would take responsibility of controlling the appliance water using the saved flow rates during training.

In other implementations, humidity sensor in bathroom can be used to detect a particular shower is used (corroborated with flow data). Other smart devices, e.g., motion detectors, that localize occupant activity to a specific device (e.g. motion in kitchen plus correlated flow rate indicates kitchen sink), contact switch that indicates interior or exterior doors are activated followed by flow rates correlated to a specific device type can be used to resolve whether a device is in could door or outdoor, or which room in a home is most likely correlated to observed flow.

A training system can be developed that uses combinations of the above multi-sensor techniques to map specific sensor combinations to specific devices. A user with a handheld device, laptop, etc. can individually activate and identify given devices. As an example, in the specific case of drain and flow sensor, the user could flush upstairs toilet in Master Bedroom, used GUI on smart device to start and stop recording event, fingerprint for that device could be memorized for that specific user/home/device. Slight differences in flow rates, accumulation, and relative timing between flow and drain activity could distinguish between devices due to differences in each of these measurements. This information can also be correlated with other sensors (motion, video, contact switches, humidity sensors, etc.) individually or in groups to enhance selectivity/accuracy of device identification.

It should be understood that the systems described above may provide multiple ones of any or each of those components and these components may be provided on either a standalone machine or, in some embodiments, on multiple machines in a distributed system. In addition, the systems, methods, and engines described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the invention has been particularly shown and described with reference to specific embodiments, it should be understood by those skilled in the art that various changes in form and detail may be made therein without departing from the spirit and scope of the invention as defined by the following claims. For example, the manifolds disclosed herein may be used to monitor flow rates of fluids other than water, such as oil, gasoline, etc.

What is claimed is:

1. A fluid flow monitoring system for identifying fluid flow events comprising:
    an ultrasonic sensor for generating measurement signals associated with respective ultrasonic signals propagating through a fluid in a chamber of a fluid distribution system, the fluid distribution system coupled to a plurality of devices capable of causing fluid flow through the chamber;
    a memory storing data representative of a plurality of device fluid flow signatures, each device fluid flow signature including statistical parameters defining a corresponding probability distribution of fluid flow rate for a corresponding device of the plurality of devices coupled to the fluid distribution system; and
    one or more processors communicatively coupled to the ultrasonic sensor and to the memory, the one or more processors:
        computing a sequence of fluid flow rate values associated with a fluid flow event based on a plurality of measurement signals generated by the ultrasonic sensor;
        determining, for each device of the plurality of devices, a corresponding first conditional probability value representing the probability of the sequence of fluid flow rate values given that the fluid flow event is caused by the device, using the statistical parameters defining the probability distribution of fluid flow rate for the device; and
        identifying, using the first conditional probability values, a first device of the plurality of devices causing the fluid flow event.

2. The fluid flow monitoring system of claim 1, wherein the plurality of device fluid flow signatures further include, for each combination of two or more devices, corresponding statistical parameters defining a corresponding probability distribution of fluid flow rate for that combination of devices.

3. The fluid flow monitoring system of claim 2, wherein the one or more processors:
    determine, for each combination of devices, a corresponding second conditional probability value representing the probability of the computed sequence of fluid flow rate values given that the fluid flow event is caused by the combination of devices, using the statistical parameters defining the probability distribution of fluid flow rate for the combination of devices; and
    identify, using the first conditional probability values and the second conditional probability values, the first device or a first combination of devices causing the fluid flow event.

4. The fluid flow monitoring system of claim 3, wherein identifying the first device or the first combination of devices, using the first conditional probability values and the second conditional probability values, includes using maximum likelihood detection.

5. The fluid flow monitoring system of claim 3, wherein identifying the first device or the first combination of devices includes using a maximum a posteriori probability model.

6. The fluid flow monitoring system of claim 1, wherein, for each device of the plurality of devices, the device fluid flow signature further includes an indication of a corresponding device event duration.

7. The fluid flow monitoring system of claim 1, wherein:
    identifying the first device includes employing a detection model generated based on the first probability values.

8. The fluid flow monitoring system of claim 7, wherein the detection model includes a Gaussian mixture model.

9. A method identifying fluid flow events in a fluid distribution system, the method comprising:
    generating, by an ultrasonic sensor of a fluid flow meter, measurement signals associated with respective ultrasonic signals propagating through a fluid in a chamber of the fluid distribution system, the fluid distribution system coupled to a plurality of devices capable of causing fluid flow through the chamber;
    storing, by a memory of the fluid flow meter, data representative of a plurality of device fluid flow signatures, each device fluid flow signature including statistical parameters defining a corresponding probability distribution of fluid flow rate for a corresponding device of the plurality of devices coupled to the fluid distribution system;

computing, by one or more processors of the fluid flow meter, a sequence of fluid flow rate values associated with a fluid flow event based on a plurality of measurement signals generated by the ultrasonic sensor, the one or more processors communicatively coupled to the ultrasonic sensor and to the memory;

determining, by the one or more processors of the fluid flow meter, for each device of the plurality of devices, a corresponding first conditional probability value representing the probability of the sequence of fluid flow rate values given that the fluid flow event is caused by the device, using the statistical parameters defining the probability distribution of fluid flow rate for the device; and identifying, by the one or more processors of the fluid flow meter, using the first conditional probability values, a device of the plurality of devices causing the fluid flow event.

10. The method of claim 9, wherein the plurality of device fluid flow signatures further include, for each combination of two or more devices, corresponding statistical parameters defining a corresponding probability distribution of fluid flow rate for that combination of devices.

11. The method of claim 10, comprising:

determining, for each combination of devices, a corresponding second conditional probability value representing the probability of the computed sequence of fluid flow rate values given that the fluid flow event is caused by the combination of devices, using the statistical parameters defining the probability distribution of fluid flow rate for the combination of devices; and identifying, using the first conditional probability values and the second conditional probability values, a device or a combination of devices causing the fluid flow event.

12. The method of claim 11, wherein identifying a device or a combination of devices, using the first conditional probability values and the second conditional probability values, includes using maximum likelihood detection.

13. The method of claim 9, wherein, for each device of the plurality of devices, the device fluid flow signature further includes an indication of a corresponding device event duration.

14. The method of claim 9, wherein:

identifying the first device includes employing a detection model generated based on the first probability values.

15. The method of claim 14, wherein the detection model includes a Gaussian mixture model.

16. The method of claim 9, wherein identifying the first device includes using a maximum a posteriori probability model.

* * * * *